(12) United States Patent
Bei et al.

(10) Patent No.: US 11,034,449 B2
(45) Date of Patent: Jun. 15, 2021

(54) SYSTEMS AND METHODS FOR UAV TRANSPORT AND DATA ACQUISITION

(71) Applicant: SZ DJI TECHNOLOGY CO., LTD., Shenzhen (CN)

(72) Inventors: Shimeng Bei, Shenzhen (CN); Yijun Guan, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 308 days.

(21) Appl. No.: 16/168,483

(22) Filed: Oct. 23, 2018

(65) Prior Publication Data
US 2019/0055018 A1     Feb. 21, 2019

Related U.S. Application Data

(63) Continuation of application No. PCT/CN2016/080840, filed on Apr. 29, 2016.

(51) Int. Cl.
*B64C 39/02*    (2006.01)
*B64D 47/08*    (2006.01)

(52) U.S. Cl.
CPC .......... *B64C 39/024* (2013.01); *B64D 47/08* (2013.01); *B64C 2201/027* (2013.01); *B64C 2201/127* (2013.01); *B64C 2201/146* (2013.01); *B64C 2201/208* (2013.01)

(58) Field of Classification Search
CPC .............. B64C 2201/208; B64C 2201/127
See application file for complete search history.

(56) References Cited

U.S. PATENT DOCUMENTS

| 8,229,163 | B2 | 7/2012 | Coleman et al. |
| 9,056,676 | B1* | 6/2015 | Wang .................. B64F 1/22 |
| 9,658,619 | B1* | 5/2017 | Bethke ................ G05D 1/102 |
| 10,810,891 | B2* | 10/2020 | Chun .................. G05D 1/101 |
| 2014/0252162 | A1 | 9/2014 | Teller et al. |
| 2014/0263823 | A1* | 9/2014 | Wang .................. B64C 1/063 |
| | | | 244/17.23 |

(Continued)

FOREIGN PATENT DOCUMENTS

| CN | 103010070 A | 4/2013 |
| CN | 103914076 A | 7/2014 |

(Continued)

OTHER PUBLICATIONS

The World Intellectual Property Organization (WIPO) International Search Report and Written Opinion for PCT/CN2016/080840 dated Jan. 26, 2017 7 Pages.

*Primary Examiner* — Ryan Rink
(74) *Attorney, Agent, or Firm* — Anova Law Group, PLLC

(57) ABSTRACT

An image capturing method for an unmanned aerial vehicle (UAV) includes determining whether the UAV is in a ground mode in which the UAV is carried by a carrier or a flight mode in which the UAV is released from the carrier, automatically adjusting a state of a camera carried by the UAV to be a first state in response to the UAV being in the ground mode or a second state in response to the UAV being in the flight mode, and controlling the camera to capture an image using the first state in response to the UAV being in the ground mode or the second state in response to the UAV being in the flight mode.

18 Claims, 19 Drawing Sheets

(56) References Cited

U.S. PATENT DOCUMENTS

| | | | |
|---|---|---|---|
| 2015/0158513 A1* | 6/2015 | Costa | B61L 23/041 |
| | | | 348/144 |
| 2015/0298788 A1* | 10/2015 | Wang | B64C 1/063 |
| | | | 701/3 |
| 2016/0122038 A1* | 5/2016 | Fleischman | G05D 1/0676 |
| | | | 701/2 |
| 2016/0196756 A1* | 7/2016 | Prakash | G08G 5/025 |
| | | | 701/3 |
| 2016/0272317 A1* | 9/2016 | Cho | G05D 1/0088 |
| 2016/0364989 A1* | 12/2016 | Speasl | B64C 39/024 |
| 2017/0129603 A1* | 5/2017 | Raptopoulos | G05D 1/0676 |
| 2017/0139424 A1* | 5/2017 | Li | G06Q 10/083 |
| 2017/0255824 A1* | 9/2017 | Miller | B61L 27/0088 |
| 2017/0270803 A1* | 9/2017 | High | G05D 1/0202 |
| 2017/0337824 A1* | 11/2017 | Chen | G05D 1/0094 |
| 2018/0044000 A1* | 2/2018 | Venturelli | B60L 53/30 |
| 2018/0332213 A1* | 11/2018 | Kucharski | H04N 7/185 |

FOREIGN PATENT DOCUMENTS

| | | |
|---|---|---|
| CN | 104853988 A | 8/2015 |
| CN | 105059558 A | 11/2015 |
| CN | 204998794 U | 1/2016 |
| CN | 105517664 A | 4/2016 |

* cited by examiner

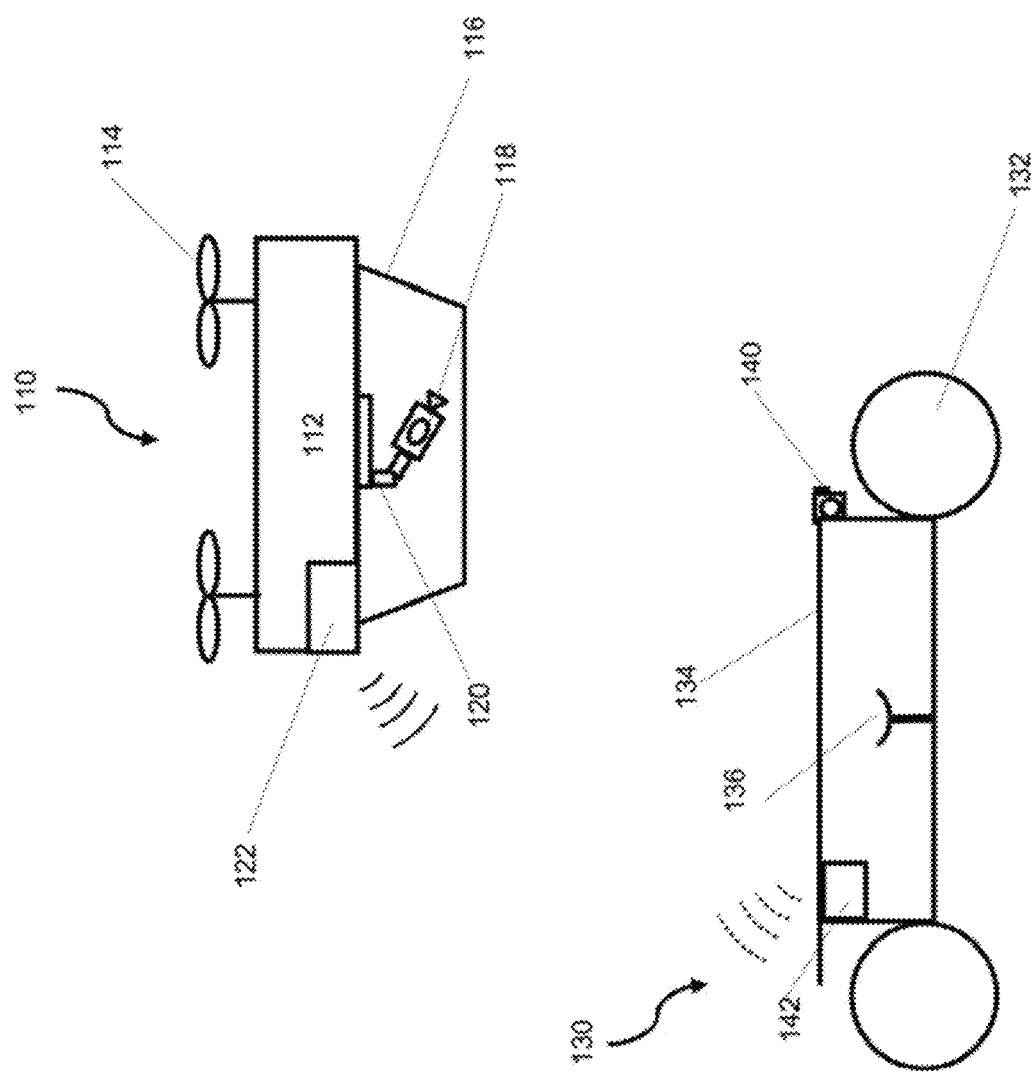
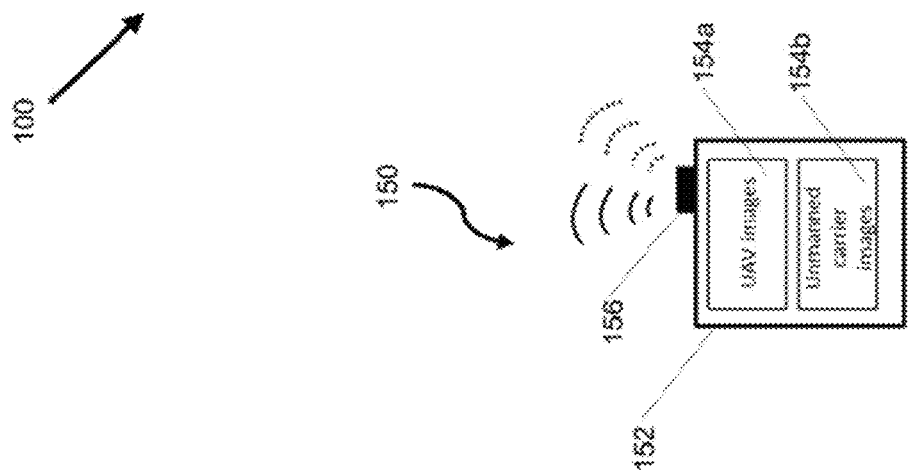
FIG. 1

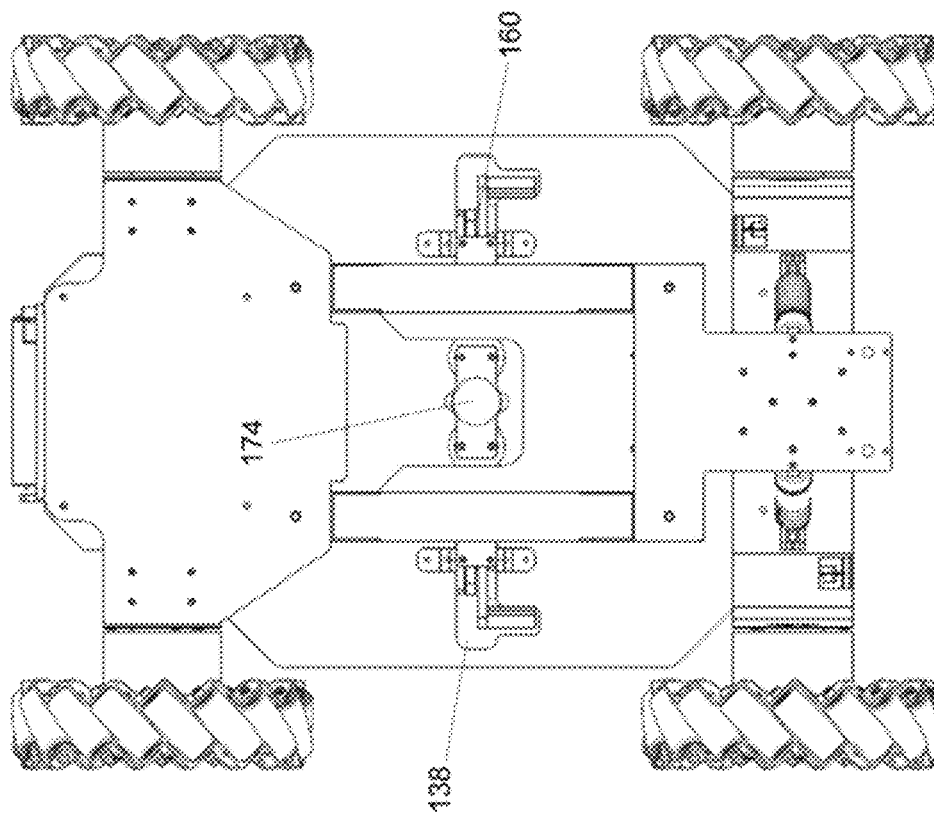
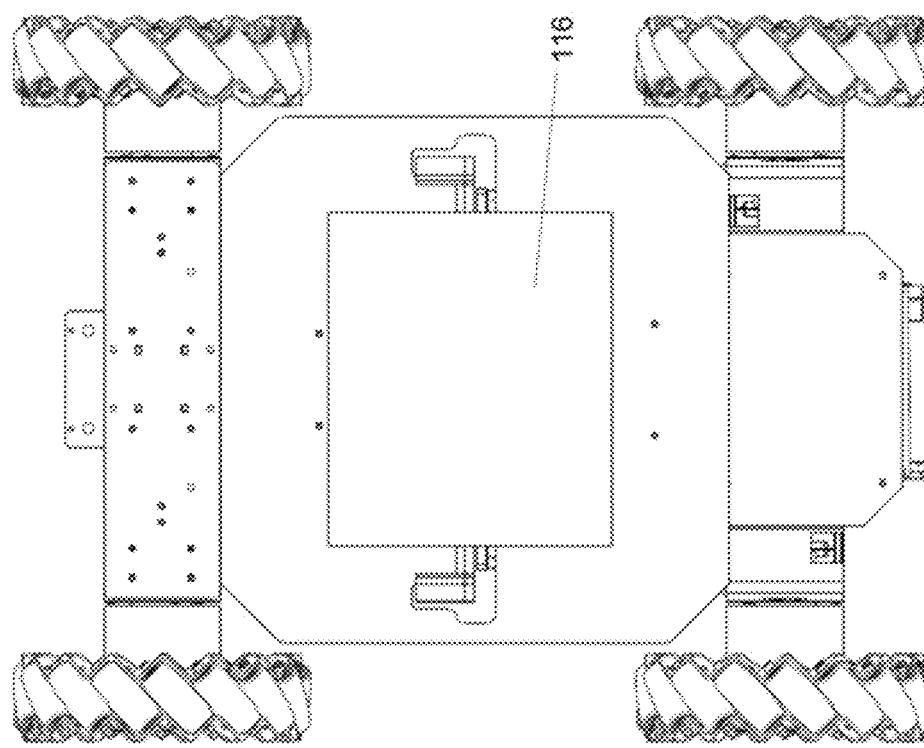
FIG. 15

SYSTEMS AND METHODS FOR UAV TRANSPORT AND DATA ACQUISITION

CROSS-REFERENCE TO RELATED APPLICATION

This application is a continuation of International Application No. PCT/CN2016/080840, filed on Apr. 29, 2016, the entire contents of which are incorporated herein by reference.

BACKGROUND

Aerial vehicles such as unmanned aerial vehicles (UAVs) can be used for performing surveillance, reconnaissance, and exploration tasks for military and civilian applications. Such aerial vehicles may carry a payload configured to perform a specific function. In some instances, the aerial vehicles may need to dock or de-dock at specific locations, and may be limited by the types of environment where they can take off or land. Additionally, the aerial vehicles may be limited to collecting aerial information during flight. In some cases, an aerial vehicle may be unable to collect ground information that cannot be readily obtained by the aerial vehicle while it is in flight.

SUMMARY

Accordingly, there exists a need for a carrier configured to carry a UAV and that is capable of traversing various types of environment. For example, the carrier may carry the UAV to traverse over bodies of water, deserts, mud fields, forests, hills, mountain, and/or other types of terrain that are physically challenging for a person (e.g., a user of the UAV) to traverse on foot or in a vehicle. The carrier may also provide a charging station for the UAV, to charge the UAV so that the UAV can be operated over an extended period of time. The carrier may work individually and/or collectively with the UAV for collecting environmental information. In some instances, the carrier may be an unmanned carrier. In some examples, the UAV may include an imaging device for capturing aerial images, and the carrier may include an imaging device for capturing ground images. The UAV may coordinate with the carrier to collect and/or generate various types of environmental information.

In some aspects of the disclosure, a method for capturing images using an unmanned aerial vehicle (UAV) is provided. The method may comprise determining, with aid of one or more processors individually or collectively, whether the UAV is in a ground mode or a flight mode. The UAV may be configured to carry a camera. The method may also comprise automatically adjusting a state of the camera to have a first state when the UAV is in the ground mode and a second state when the UAV is in the flight mode. The UAV may be in the ground mode when the weight of the UAV is borne by an unmanned carrier which is configured to carry the UAV. The UAV may be in the flight mode when the UAV is released from the unmanned carrier. The method may further comprise controlling the camera to capture images using the camera in the first state when the UAV is in the ground mode and the second state when the UAV is in the flight mode.

According to another aspect of the disclosure, a system for capturing images using a UAV is provided. The system may comprise one or more processors individually or collectively configured to determine whether the UAV is in a ground mode or a flight mode. The UAV may be configured to carry a camera. The system may also comprise one or more processors individually or collectively configured to automatically adjust a state of the camera to have a first state when the UAV is in the ground mode and a second state when the UAV is in the flight mode. The UAV may be in the ground mode when the weight of the UAV is borne by an unmanned carrier which is configured to carry the UAV. The UAV may be in the flight mode when the UAV is released from the unmanned carrier. The system may further comprise one or more processors individually or collectively configured to control the camera to capture images in the first state when the UAV is in the ground mode and the second state when the UAV is in the flight mode.

A method for capturing images using an unmanned carrier may be provided in accordance with an additional aspect of the disclosure. The method may comprise determining, with aid of one or more processors individually or collectively, a relative state between an unmanned aerial vehicle (UAV) and the unmanned carrier. The UAV may be capable of landing on the unmanned carrier or taking off from the unmanned carrier for flight. The unmanned carrier may be configured to carry a camera. The method may further comprise adjusting a state of the camera based on the relative state, and controlling the camera to capture images.

Further aspects of the disclosure may be directed to an apparatus for capturing images using an unmanned carrier. The apparatus may comprise one or more processors individually or collectively configured to determine a relative state between an unmanned aerial vehicle (UAV) and the unmanned carrier. The UAV may be capable of landing on the unmanned carrier or taking off from the unmanned carrier for flight. The unmanned carrier may be configured to carry a camera. The one or more processors may be further configured to generate a first signal for adjusting the state of the camera attached to the unmanned carrier based on the state of the UAV, and generating a second signal for controlling the camera to capture images.

According to another aspect of the disclosure, a method of controlling an unmanned carrier with respect to an unmanned aerial vehicle (UAV) may be provided. The method may comprise determining, with aid of one or more processors individually or collectively, a state of the UAV; and adjusting a state of the unmanned carrier based on the state of the UAV. The state of the UAV may comprise at least: (1) a first state wherein the UAV is docked on the unmanned carrier; (2) a second state wherein the UAV is in flight mode and separated from the unmanned carrier; (3) a third state wherein the UAV is ready to dock on the unmanned carrier; or (4) a fourth state wherein the UAV is ready to take off from the unmanned carrier.

In some aspects of the disclosure, an apparatus of controlling an unmanned carrier with respect to an unmanned aerial vehicle (UAV) may be provided. The system may comprise one or more processors individually or collectively configured to determine a state of the UAV. The system may further comprise a controller configured to adjust a state of the unmanned carrier based on the state of the UAV. The state of the UAV may comprise at least: (1) a first state wherein the UAV is docked on the unmanned carrier; (2) a second state wherein the UAV is in flight mode and separated from the unmanned carrier; (3) a third state wherein the UAV is ready to dock on the unmanned carrier; or (4) a fourth state wherein the UAV is ready to take off from the unmanned carrier.

An unmanned carrier for carrying an unmanned aerial vehicle (UAV) may be provided in accordance with an additional aspect of the disclosure. The unmanned carrier may comprise a landing area configured to support the UAV when the UAV is landed on the unmanned carrier; a coupling unit configured to releasably couple with one or more landing gears of the UAV when the UAV is supported by the landing area; and one or more propulsion components configured to propel the unmanned carrier.

Further aspects of the disclosure may be directed to a method for carrying an UAV on an unmanned carrier. The method may comprise: providing a landing area configured to support the UAV when the UAV is landed on the unmanned carrier; providing a coupling unit configured to releasably couple with one or more landing gears of the UAV when the UAV is supported by the landing area; and propelling the unmanned carrier using one or more propulsion components.

A method for docking an UAV on an unmanned carrier may be provided in accordance with an additional aspect of the disclosure. The method may comprise operating one or more propulsion units to propel the unmanned carrier; receiving signals related to docking of the UAV on the unmanned carrier; and preparing a coupling unit of the unmanned carrier for receiving the UAV, wherein the coupling unit is configured to couple to one or more landing gears of the UAV.

In some aspects of the disclosure, a system for docking a UAV on an unmanned carrier may be provided. The system may comprise: a power control module configured to control one or more propulsion units to propel the unmanned carrier; a communication module configured to receive signals related to docking of the UAV on the unmanned carrier; and a docking module configured to prepare a coupling unit of the unmanned carrier for receiving the UAV, wherein the coupling unit is configured to couple to one or more landing gears of the UAV.

It shall be understood that different aspects of the disclosure can be appreciated individually, collectively, or in combination with each other. Various aspects of the disclosure described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space. Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 1 illustrates an example of an unmanned aerial vehicle (UAV) that may be associated with a carrier, in accordance with some embodiments.

FIGS. 13, 14, and 15 illustrate different schematic views of an unmanned carrier supporting an object, in accordance with some embodiments.

DETAILED DESCRIPTION

Figure 2:
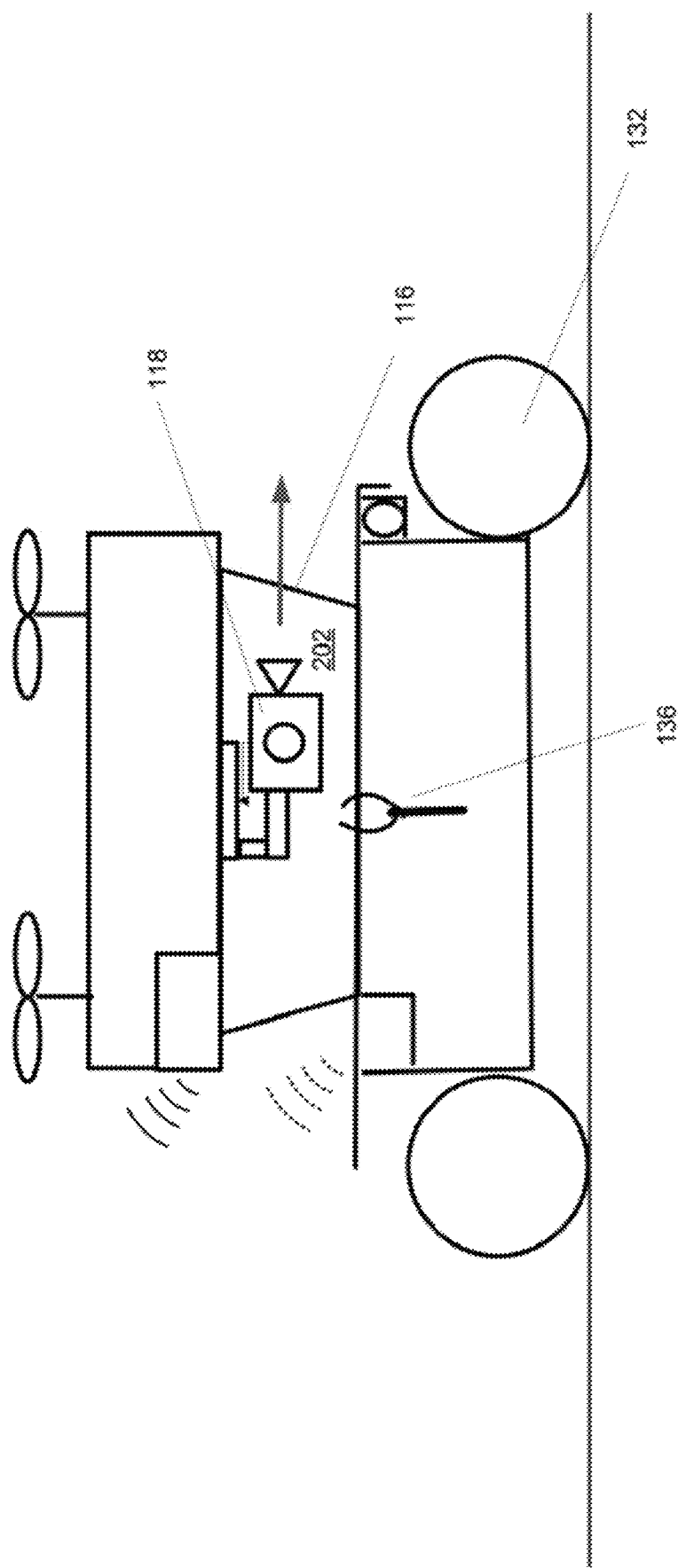
FIG. 2 is a schematic showing a UAV camera in a first state when the UAV in a ground mode, in accordance with some embodiments.

A carrier for carrying an unmanned aerial vehicle (UAV) may be provided in accordance with different embodiments of the disclosure. Here, a carrier for carrying a UAV is also referred to as a "carrying vehicle." The carrier may be configured to traverse different types of environment. The description of a UAV herein may be applied to any other type of unmanned vehicle, or any other type of movable object. The description of a carrier herein may apply to any land-bound, underground, underwater, water surface, aerial, or space-based vehicles. The interaction between the UAV and the carrier may include docking of the UAV on the carrier and/or de-docking of the UAV from the carrier. Communications may occur between the UAV and the carrier while the UAV is separated from the carrier and/or while the UAV is connected or coupled to the carrier.

The carrier may be an unmanned carrier. The unmanned carrier may carry the UAV to traverse in various environments. For example, the unmanned carrier may carry the UAV to traverse over bodies of water, deserts, mud fields, forests, hills, mountain, and/or other types of terrain that are physically challenging for a person (e.g., an operator of the UAV) to traverse on foot or in a vehicle. The unmanned carrier may also provide a charging station for the UAV, to charge the UAV so that the UAV can be operated over an extended period of time. The unmanned carrier may work individually and/or collectively with the UAV for collecting environment information. The UAV may coordinate with the unmanned carrier to collect and/or generate various types of environment information. In some examples, the UAV may include an imaging device for capturing aerial images, and the unmanned carrier may include an imaging device for capturing ground images.

Various embodiments of the disclosure are next described in detail below with reference to the drawings.

FIG. 1 shows an example of a UAV that may be associated with a carrier, in accordance with some embodiments. A UAV-carrier system 100 is provided in accordance with some embodiments of the disclosure. The UAV-carrier system may include a UAV 110 and a carrier 130. In the example of FIG. 1, the carrier 130 is an unmanned carrier, although this is not a limitation of the disclosure. In some alternative embodiments, the carrier may be operated by an individual that is on-board the carrier. Any description herein of a UAV and/or an unmanned carrier may apply to any type of movable object. Also, any description herein of a UAV and/or an unmanned carrier may apply to any type of unmanned movable object (e.g., which may traverse air, land, water, or space).

The UAV 110 may be an aerial vehicle. The UAV may have one or more propulsion units 114 that may permit the UAV to move about in the air. The one or more propulsion units may enable the UAV to move about one or more, two or more, three or more, four or more, five or more, six or more degrees of freedom. In some instances, the UAV may be able to rotate about one, two, three or more axes of rotation. The axes of rotation may be orthogonal to one another. The axes of rotation may remain orthogonal to one another throughout the course of the UAV's flight. The axes of rotation may include a pitch axis, roll axis, and/or yaw axis. The UAV may be able to move along one or more dimensions. For example, the UAV may be able to move upwards due to the lift generated by one or more rotors. In some instances, the UAV may be capable of moving along a Z axis (which may be up relative to the UAV orientation), an X axis, and/or a Y axis (which may be lateral). The UAV may be capable of moving along one, two, or three axes that may be orthogonal to one another.

The UAV 110 may be a rotorcraft. In some instances, the UAV may be a multi-rotor craft that may include a plurality of rotors. The plurality or rotors may be capable of rotating to generate lift for the UAV. The rotors may be propulsion units that may enable the UAV to move about freely through the air. The rotors may rotate at the same rate and/or may generate the same amount of lift or thrust. The rotors may optionally rotate at varying rates, which may generate different amounts of lift or thrust and/or permit the UAV to rotate. In some instances, one, two, three, four, five, six, seven, eight, nine, ten, or more rotors may be provided on a UAV. The rotors may be arranged so that their axes of rotation are parallel to one another. In some instances, the rotors may have axes of rotation that are at any angle relative to one another, which may affect the motion of the UAV.

A vertical position and/or velocity of the UAV 110 may be controlled by maintaining and/or adjusting output to one or more propulsion units of the UAV. For example, increasing the speed of rotation of one or more rotors of the UAV may aid in causing the UAV to increase in altitude or increase in altitude at a faster rate. Increasing the speed of rotation of the one or more rotors may increase the thrust of the rotors. Decreasing the speed of rotation of one or more rotors of the UAV may aid in causing the UAV to decrease in altitude or decrease in altitude at a faster rate. Decreasing the speed of rotation of the one or more rotors may decrease the thrust of the one or more rotors. When a UAV is taking off, such as from the unmanned carrier, the output may be provided to the propulsion units may be increased from its previous landed state. Conversely, when the UAV is landing, such as on the unmanned carrier, the output provided to the propulsion units may be decreased from its previous flight state.

A lateral position and/or velocity of the UAV 110 may be controlled by maintaining and/or adjusting output to one or more propulsion units of the UAV. The attitude of the UAV and the speed of rotation of one or more rotors of the UAV may affect the lateral movement of the UAV. For example, the UAV may be tilted in a particular direction to move in that direction, and the speed of the rotors of the UAV may affect the speed of the lateral movement and/or trajectory of movement. Lateral position and/or velocity of the UAV may be controlled by varying or maintaining the speed of rotation of one or more rotors of the UAV.

The UAV 110 may be of small dimensions. The UAV may be capable of being lifted and/or carried by a human. The UAV may be capable of being carried by a human in one hand. The UAV may be capable of fitting on top of the unmanned carrier 130 or within the unmanned carrier. The UAV may be capable of being carried by a roof of the unmanned carrier. The UAV may be capable of being carried on top of a trunk of the unmanned carrier. The UAV may be capable of being carried by a front hood of the unmanned carrier. The UAV dimensions may optionally not exceed the width of the unmanned carrier. The UAV dimensions may optionally not exceed the length of the carrier.

The UAV 110 may have a body 112. The UAV body may optionally include a housing that may enclose one or more components of the UAV. For instance, a housing may enclose one or more electrical components of the UAV. Examples of electrical components may include, but are not limited to, a flight controller of the UAV, an inertial measurement unit, a power supply unit, a memory storage unit, one or more processors, a navigational unit (e.g. GPS), a communication unit, one or more electronic speed controls (ESCs), one or more actuators, or one or more sensors. Examples of sensors may include, but are not limited to, location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, lidar, time-of-flight cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own source) and passive sensors (e.g., sensors that detect available energy). The UAV body may support one or more components, such as one or more of the electrical components. The one or more components may be within a housing, outside a housing, embedded into a housing, or any combination thereof.

The UAV body may be a central body. Optionally one or more arms may extend from the central body. An arm may support one or more propulsion units that may aid the UAV in flight. The propulsion units may include one or more rotors that may generate lift for the UAV. The propulsion units may include a rotor blade and a corresponding actuator that may effect rotation of the rotor blades about an axis. The lift may be in the direction of the axis. In some embodiments, one or more, two or more, three or more, four or more, five or more, six or more, seven or more, eight or more, ten or more, twelve or more, twenty or more, or thirty or more arms may extend from the central body. Each arm may have one or more, two or more, three or more, four or more, or five or more propulsion units supported by the arm.

The UAV may have any other characteristic as described in greater detail elsewhere herein. Any description herein of a UAV may apply to any movable object having a characteristic as described in greater detail elsewhere herein.

The UAV 110 may be configured to carry a payload 118. The payload can include one or more sensors for surveying or tracking objects in the surrounding environment. Examples of a payload may include an image capturing device or imaging device (e.g., camera or camcorder, infrared imaging device, ultraviolet imaging device, or the like), an audio capture device (e.g., a parabolic microphone), an infrared imaging device, or the like. Any suitable sensor(s) can be incorporated into the payload to capture any visual, audio, electromagnetic, or any other desirable signals. The sensors can provide static sensing data (e.g., a photograph) or dynamic sensing data (e.g., a video). The sensors may capture sensing data continuously in real time or at high frequencies. In some instances, the payload may be a camera that may capture images at frequencies of 10 Hz, 20 Hz, 30 Hz, 40 Hz, 50 Hz, 60 Hz, 70 Hz, 80 Hz, 90 Hz, 100 Hz, or higher.

In some embodiments, the payload 118 may be operably coupled to the body of the UAV via a support platform 120. The support platform may be configured to support the payload. The support platform may permit the payload to move relative to the UAV. For instance, the support platform may permit the payload to rotate around one, two, three, or more axes. For instance, the payload may move about a roll, yaw, and/or pitch axes. Alternatively or additionally, the support platform may permit the payload to move linearly along one, two, three, or more axes. The axes for the rotational or translational movement may or may not be orthogonal to each other.

In alternative embodiments, the payload may be rigidly coupled to or connected with the UAV such that the payload remains substantially stationary relative to the UAV. For example, the support platform that connects the UAV and the payload may not permit the payload to move relative to the UAV. Alternatively, the payload may be coupled directly to the UAV without requiring a support platform.

In some embodiments, the UAV may include a landing stand 116. The landing stand may be configured to bear the weight of the UAV while the UAV is not airborne. In some instances, a mechanical connection may be formed between the landing stand of the UAV and a coupling unit of the unmanned carrier, as described in detail later in the specification.

The unmanned carrier 130 may be any type of movable object. Examples of unmanned carriers may include any movable type of chassis that is capable of motion. The unmanned carrier may be used for carrying the UAV to traverse in various environments.

The unmanned carrier 130 may have one or more propulsion components 132 that may permit the unmanned carrier to move about. The unmanned carrier may traverse the land, air, water, or space. The unmanned carrier may be capable of moving over land, underground, underwater, on the water's surface, in the air, and/or in space. The one or more propulsion components may enable the unmanned carrier to move about one or more, two or more, three or more, four or more, five or more, six or more degrees of freedom. The one or more propulsion components may permit the unmanned carrier to move within any environment. For example, the propulsion components may include wheels that may permit the unmanned carrier to move over land. Other examples of propulsion components may include, but are not limited to treads, propellers, rotors, jets, legs, or any other type of propulsion component. The propulsion components may enable the unmanned carrier to move over a single type or multiple types of terrain. The propulsion components may permit the unmanned carrier to move up inclines or down slopes. The unmanned carrier may be self-propelled.

The unmanned carrier 130 may have an engine, battery, or any type of driver. In some instances, the unmanned carrier may have an internal combustion engine. The unmanned carrier may run on a fuel and/or on electricity. The propulsion components of the unmanned carrier may be driven by the engine, battery, or other type of power source.

The unmanned carrier 130 may have a body. The unmanned carrier may optionally include a housing that may enclose one or more components of the unmanned carrier. For instance, a housing may enclose one or more electrical components of the unmanned carrier. Examples of electrical components may include, but are not limited to, a motion controller of the unmanned carrier, an inertial measurement unit, a power supply unit, a memory storage unit, one or more processors, a navigational unit (e.g. GPS), a communication unit, one or more electronic speed controls (ESCs), one or more actuators, or one or more sensors. Examples of sensors may include, but are not limited to, location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, lidar, time-of-flight cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own source) and passive sensors (e.g., sensors that detect available energy). The unmanned carrier may support one or more components, such as one or more of the electrical components. The one or more components may be within a housing, outside a housing, embedded into a housing, or any combination thereof.

In the example of FIG. 1, the unmanned carrier may include an imaging device 140 (e.g., a camera). The imaging device may be mounted on a front side of the unmanned carrier. The imaging device may alternatively be mounted on any other side of the unmanned carrier. The imaging device may be rigidly coupled to or connected with the unmanned carrier such that the imaging device remains substantially stationary relative to the unmanned carrier. Alternatively, the imaging device 140 on the unmanned carrier may be able to move relative to the UAV while the UAV is in flight. The shooting angle of the imaging device 140 may be adjusted simultaneously or separately as the imaging device is capturing images. In some embodiments, the unmanned carrier can further include one or more sensors for surveying or tracking objects in the surrounding environment.

The UAV 110 may be capable of interacting with the unmanned carrier 130. The unmanned carrier and/or the UAV may be remotely operated by one or more individuals. The unmanned carrier and/or the UAV may be capable of responding to commands from a control terminal 150. The control terminal may or may not be physically connected to the unmanned carrier and/or the UAV. In some instances, the unmanned carrier and/or the UAV may be capable of operating autonomously or semi-autonomously. The unmanned carrier and/or the UAV may be capable of following a set of pre-programmed instructions. The unmanned carrier may be controlled wirelessly by the control terminal. The unmanned carrier may be operated autonomously without requiring a user input.

The unmanned carrier 130 may be a docking vehicle with which the UAV 110 may dock. The UAV may land on the unmanned carrier. The UAV may take off from the unmanned carrier. The UAV may be carried by the unmanned carrier while the UAV is docked to the unmanned carrier. In some embodiments, a mechanical connection may be formed between the UAV and the unmanned carrier while the UAV is docked to the unmanned carrier. The unmanned carrier may be in motion while the UAV is docked to the unmanned carrier. The unmanned carrier may remain stationary and/or move while the UAV is docked to the unmanned carrier.

The UAV 110 may dock to the unmanned carrier 130 on any part of the unmanned carrier. For example, the UAV may dock to a landing area 134 of the unmanned carrier. The UAV may be docked to a top surface of the unmanned carrier. The UAV may be docked to a trunk of the unmanned carrier. For example, the UAV may be carried on a top surface of the trunk of the unmanned carrier. In another example, the UAV may be docked to a front hood of the unmanned carrier. The UAV may be carried on a top surface of the front hood of the unmanned carrier. In some instances, the UAV may dock with a trailer pulled by the unmanned carrier, or on a side portion of the unmanned carrier.

The UAV 110 may take off from the unmanned carrier 130. In some instances, the UAV may take off while the unmanned carrier is in operation. The UAV may take off while the unmanned carrier is powered on and/or while an individual is remotely operating the unmanned carrier using the control terminal 150. The UAV may take off while the unmanned carrier engine or motor is running. The UAV may take off while the unmanned carrier is stationary and/or while the unmanned carrier is in motion. In taking off, the UAV may ascend relative to the unmanned carrier. For example, if the UAV is a multi-rotor craft, one or more rotors of the UAV may rotate to generate lift for the UAV. The UAV may gain altitude and be separated from the unmanned carrier. In some instances, additional separation steps may occur to undock the UAV from the unmanned carrier.

The UAV may be in flight while the unmanned carrier is in motion. In some embodiments, the UAV may remain in communication with the unmanned carrier. The UAV may send information to the unmanned carrier. The unmanned carrier may or may not send information to the UAV while the UAV is in flight.

A mechanical connection may be formed between a portion of the UAV 110 and a coupling unit 136 of the unmanned carrier 130. The portion of the UAV that may form the connection may be on a lower surface of the UAV. In some examples, the portion of the UAV that may form the connection may be an extension, such as the landing stand 116 of the UAV. The landing stand may be configured to bear the weight of the UAV while the UAV is not airborne. In some instances, the portion of the UAV that may form the connection may be a surface of a housing of the UAV, such as a bottom surface, side surface, or top surface of the UAV. In some instances, the housing itself may be a portion that may form the connection. In other instances, protrusions, indentations, or any other portion of the UAV may be used to form the connection. The UAV may include a portion that may move (e.g., extend out, retract in) relative to the UAV to form the connection. In one example, a connection member of the UAV may be in a retracted state while the UAV is in flight, but may extend out when the UAV is docking with the unmanned carrier to form the connection.

The UAV 110 and/or the unmanned carrier 130 can be configured to receive control data from the user. The control terminal 150 can be configured to provide the control data. The control data may be generated based on input from a user operating the control terminal. Alternatively or additionally, the control data may be provided by other non-user sources such as a remote or local data store, other computing devices operative connected to the control terminal, control and communication devices onboard the unmanned carrier, or the like. The control data can be used to control, directly or indirectly, various aspects of the UAV, unmanned carrier, payload(s), one or more sensors, etc. In some embodiments, the control data can include navigation commands for controlling navigational parameters of the UAV and/or the unmanned carrier such as the position, speed, orientation, or attitude of the UAV and/or the unmanned carrier. The control data can be used to control flight of the UAV. The control data can also be used to control or effect movement of the unmanned carrier. The control data may affect operation of one or more propulsion systems that may affect the flight of the UAV.

In some embodiments, the control data can include commands for controlling individual components onboard or carried by the UAV. For instance, the control data may include information for controlling the operations of the support platform 120 of the UAV. For example, the control data may be used to control an actuation mechanism (e.g., a motor) of the support platform so as to cause angular and/or linear movement of the payload relative to the UAV. As another example, the control data may be used to adjust one or more operational parameters for the payload such as taking still or moving pictures, zooming in or out, turning on or off, switching imaging modes, change image resolution, changing focus, changing depth of field, changing exposure time, changing speed of lens, changing viewing angle or field of view, or the like. In other embodiments, the control data may be used to control other components onboard the UAV such as a sensing system (not show), communication system (not shown), and the like.

The UAV 110 and/or the unmanned carrier 130 can be configured to provide data, and the control terminal 150 can be configured to receive data. In various embodiments, the data received by the control terminal may include raw data (e.g., raw image data) and/or processed data (e.g., compressed image data). For example, the data can include raw image data acquired by a camera 118 onboard the UAV, and/or processed data such as compressed image data generated onboard the UAV based on the images captured by the UAV camera. For example, real-time or nearly real-time video can be streamed from the UAV and/or the UAV camera to the control terminal. Similarly, the data can include raw image data acquired by a camera 140 onboard the unmanned carrier, and/or processed data such as compressed image data generated onboard the unmanned carrier based on the images captured by the unmanned carrier camera. For example, real-time or nearly real-time video can be streamed from the unmanned carrier and/or the unmanned carrier camera to the control terminal.

The control terminal 150 can be located at a location distant or remote from the UAV and/or the unmanned carrier. The control terminal can be disposed on or affixed to a base platform. Alternatively, the control terminal can be a handheld or wearable device. For example, the control terminal can include a smartphone, tablet, laptop, computer, glasses, gloves, helmet, microphone, or suitable combinations thereof.

The control terminal 150 can be configured to display data received from the UAV and/or the unmanned carrier via one or more graphical displays. The displayed data may include images (e.g., still images or videos) acquired by imaging devices carried by the UAV and/or the unmanned carrier. For example, the UAV images and the unmanned carrier images may be displayed simultaneously on a display of the control terminal in parallel. Alternatively, the UAV images and the unmanned carrier images may be displayed in an overlay mode, a picture-in-picture mode, or other suitable mode. The displayed data may also include other information that may be displayed separately from the image data or superimposed on top of the image data. In some embodiments, image data may be displayed in substantially real-time as the images are generated and/or transmitted to the control terminal. For instance, the images and/or other data may be displayed within 10 seconds, 5 seconds, 3 seconds, 2 seconds, 1 second, 0.5 seconds, 0.1 seconds of being captured by the UAV camera and/or the unmanned carrier camera. In other embodiments, the display may be provided after some delay. In some embodiments, the panoramic image and/or other data may be stored, transmitted, or otherwise processed by the control terminal.

The control terminal can be configured to receive user input via an input device. The input device may include a joystick, keyboard, mouse, touchscreen, stylus, microphone, image or motion sensor, inertial sensor, and the like. A display device at the control terminal may be the same device as the input device. Alternatively, the display device may be a separate device from the input device. Yet in another embodiment, the display device may be a component of the input device.

Any suitable user input can be used to interact with the control terminal, such as manually entered commands, voice control, gesture control, or position control (e.g., via a movement, location or tilt of the terminal). For instance, the control terminal may be configured to allow a user to control a state of the UAV, unmanned carrier, payload, or any component thereof by manipulating a joystick, changing an orientation or attitude of the control terminal, interacting with a graphical user interface using a keyboard, mouse, finger, or stylus, or by using any other suitable methods. For example, the control terminal may be configured to allow a user to control various aspects of the panoramic mode of operation as discussed herein. The control terminal may also comprise an eye-tracking device including a sensor for tracking eye-gaze of the user while the user is viewing images on the display. The tracked eye-gaze may be used for determining user's region-of-interest (ROI) in real time. The determined ROI may be sent to the UAV camera and/or the unmanned carrier camera. An image encoder may be used to adjust image compression strategy based on the ROI. The UAV camera and/or the unmanned carrier camera may be configured to adjust one or more image capture parameters, based on the ROI for capturing the images.

The UAV 110 and/or the unmanned carrier 130 may be capable of responding to commands from the control terminal 150. The control terminal may be remote from the UAV and/or the unmanned carrier. Optionally, the control terminal may be located on the unmanned carrier. The UAV and/or the unmanned carrier may be in communication with the control terminal using one or more communication components respectively located on the UAV and the unmanned carrier. For example, the UAV may include a communication component 122 and the unmanned carrier may include a communication component 142. The control terminal may or may not be connected to the UAV and/or the unmanned carrier. The UAV and the unmanned carrier may communicate with each other via the control terminal. Optionally, the UAV and the unmanned carrier may communicate with each other directly without transmitting through the control terminal. In some instances, the UAV and/or the unmanned carrier may be capable of operating autonomously or semi-autonomously. The UAV and/or the unmanned carrier may be capable of following a set of pre-programmed instructions. In some instances, the UAV and/or the unmanned carrier may operate semi-autonomously by responding to one or more commands from the control terminal while otherwise operating autonomously.

A user may use the control terminal to control the UAV and/or the unmanned carrier. In some instances, a user can use the control terminal to effect movement of the UAV and/or the unmanned carrier. Examples may include effecting: (1) movement of the unmanned carrier while it is carrying the UAV, (2) take-off of the UAV from the unmanned carrier when the UAV is docked on the unmanned carrier, (3) landing of the UAV onto the unmanned carrier while the UAV is in flight, (4) movement of at least one of the unmanned carrier and the UAV while the UAV is in flight, (5) movement of the unmanned carrier and the UAV to a same location or to different locations, (6) movement of the unmanned carrier and the UAV at a same time, sequentially, at different points in time, or for different durations of time, and/or (7) relative movement between the UAV and the unmanned carrier, such that (i) the unmanned carrier is following the UAV while the UAV is flight, or (ii) the UAV is following the unmanned carrier while the unmanned carrier is in motion.

A user may also use the control terminal to activate one or more payloads supported by the UAV and/or the unmanned carrier. A payload may include one or more sensors that are configured to collect information about an environment in which the UAV and/or the unmanned carrier is located. The one or more sensors may include one or more imaging devices such as cameras.

As shown in FIG. 1, the control terminal 150 may comprise a computer-implemented graphical display 152 configured to display one or more images 154. Some of the images may be captured by an imaging device onboard the UAV. Optionally, some of the images may be captured by an imaging device onboard the unmanned carrier. The images may be displayed on the control terminal to a user. In some instances, the images may be captured and displayed on the control terminal substantially in real time.

The imaging device onboard the UAV may be configured to capture a first set of images. The imaging device onboard the unmanned carrier may be configured to capture a second set of images. The first set of images may be displayed 154*a* on the control terminal. The second set of images may be displayed 154*b* on the control terminal. In some cases, the first and second sets of images may be displayed separately on different sections of the control terminal, for example as shown in FIG. 1. Optionally, the first and second sets of images may be displayed sequentially on the control terminal. In some embodiments, the first and second sets of images may be fused together to form a third set of images encompassing both aerial and ground views of an environment. In some instances, the control terminal may be configured to display environmental data based in part on the first and/or second set of images.

As previously described, the UAV 110 may include an imaging device 118, and the unmanned carrier 130 may include an imaging device 140. An imaging device as used herein may serve as an image capture device. An imaging device may be a physical imaging device. An imaging device can be configured to detect electromagnetic radiation (e.g., visible, infrared, and/or ultraviolet light) and generate image data based on the detected electromagnetic radiation. An imaging device may include a charge-coupled device (CCD) sensor or a complementary metal-oxide-semiconductor (CMOS) sensor that generates electrical signals in response to wavelengths of light. The resultant electrical signals can be processed to produce raw image data. The raw image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia). The imaging device may include a lens configured to direct light onto an image sensor.

An imaging device can be a camera. A camera can be a movie or video camera that captures dynamic image data (e.g., video). A camera can be a still camera that captures static images (e.g., photographs). A camera may capture both dynamic image data and static images. A camera may switch between capturing dynamic image data and static images. Although certain embodiments provided herein are described in the context of cameras, it shall be understood that the present disclosure can be applied to any suitable imaging device, and any description herein relating to cameras can also be applied to any suitable imaging device, and any description herein relating to cameras can also be applied to other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene. The camera may comprise optical elements (e.g., lens, mirrors, filters, etc). The camera may capture color images, greyscale image, infrared images, and the like.

The imaging device may capture a raw image or a sequence of raw images (e.g., raw image data captured at a sequence of time points. In some embodiments, the image resolution may be defined by the number of pixels in an image. In some embodiments, the image resolution may be greater than or equal to about 352×420 pixels, 480×320 pixels, 720×480 pixels, 1280×720 pixels, 1440×1080 pixels, 1920×1080 pixels, 2048×1080 pixels, 3840×2160 pixels, 4096×2160 pixels, 7680×4320 pixels, or 15360×8640 pixels. In some embodiments, the camera may be a 4K camera or a camera with a higher resolution. Alternatively or additionally, the images captured by the imaging device may have the same or different filed of views from each other.

The imaging device may capture a sequence of raw images at a specific capture rate. In some embodiments, the sequence of images may be captured standard video frame rates such as about 24p, 25p, 30p, 48p, 50p, 60p, 72p, 90p, 100p, 120p, 300p, 50i, or 60i. In some embodiments, the sequence of images may be captured at a rate less than or equal to about one image every 0.0001 seconds, 0.0002 seconds, 0.0005 seconds, 0.001 seconds, 0.002 seconds, 0.005 seconds, 0.01 seconds, 0.02 seconds, 0.05 seconds. 0.1 seconds, 0.2 seconds, 0.5 seconds, 1 second, 2 seconds, 5 seconds, or 10 seconds. In some embodiments, the capture rate may change depending on user input and/or external conditions (e.g. rain, snow, wind, unobvious surface texture of environment).

The imaging device may have adjustable parameters. Under differing parameters, different images may be captured by the imaging device while subject to identical external conditions (e.g., location, lighting). The adjustable parameter may comprise exposure (e.g., depth of field, exposure time, shutter speed, aperture, film speed), zoom, gain, gamma, area of interest, binning/subsampling, pixel clock, offset, triggering, ISO, etc. Parameters related to exposure may control the amount of light that reaches an image sensor in the imaging device. For example, shutter speed may control the amount of time light reaches an image sensor and aperture may control the amount of light that reaches the image sensor in a given time. Parameters related to gain may control the amplification of a signal from the optical sensor. ISO may control the level of sensitivity of the camera to available light. Parameters controlling for exposure and gain may be collectively considered and be referred to herein as EXPO.

The captured image data may be transmitted from a communication interface on the movable object (e.g., the UAV) towards a communication interface on the control terminal. The captured images may be transmitted from a communication interface on the unmanned carrier towards a communication interface on the control terminal.

The control terminal 150 may be located remotely from the UAV and/or the unmanned carrier. For example, the control terminal may be located on the ground. The control terminal may transmit various control signals to the UAV and/or the unmanned carrier via an uplink, e.g., wireless link. The wireless link may include a RF (radio frequency) link, a Wi-Fi link, a Bluetooth link, a 3G link, or a LTE link. The wireless link may be used for transmission of control data over long distances. For example, the wireless link may be used over distances equal to or greater than about 5 m, 10 m, 15 m, 20 m, 25 m, 50 m, 100 m, 150 m, 200 m, 250 m, 300 m, 400 m, 500 m, 750 m, 1000 m, 1250 m, 1500 m, 1750 m, 2000 m, 2500 m, 3000 m, 3500 m, 4000 m, 4500 m, 5000 m, 6000 m, 7000 m, 8000 m, 9000 m, or 10000 m. A receiver may be located onboard the UAV and/or the unmanned carrier. For example, the communication component 122 of the UAV may include a receiver, and the communication component 142 of the unmanned carrier may include a receiver. The control terminal may include a communication component 156 comprising a transceiver. The bandwidth of the communication between the UAV/unmanned carrier and the control terminal may be in a range from about 10 Kbps to about 1M bps. The raw image data may be compressed onboard the UAV and/or the unmanned carrier using any suitable technologies before transmitting to the control terminal.

In the example of FIG. 1, the unmanned carrier 130 may comprise one or more propulsion components 132, a landing area 134, and a coupling unit 136. The unmanned carrier may also include a camera 140. The one or more propulsion components may be configured to propel the unmanned carrier within an environment (e.g., over a physical terrain). The landing area may be configured to support the UAV when the UAV is landed on the unmanned carrier. The coupling unit may be configured to releasably couple with the UAV when the UAV is borne by the landing area.

The unmanned carrier may be controlled based on a relative state between the UAV and the unmanned carrier. Control of the unmanned carrier may include adjusting a state of the unmanned carrier. The state of the unmanned carrier may include an operational state of the unmanned carrier that is associated with the UAV. The operational state may depend on, for example, whether the UAV is landed or coupled to the unmanned carrier, or whether the UAV is in flight and separated from the unmanned carrier. The state of the unmanned carrier may be adjusted based on the relative state between the UAV and the unmanned carrier.

A state of the UAV may be determined using one or more processors. The one or more processors may be located on the UAV, on the unmanned carrier, and/or on the remote control terminal. A controller implemented using the one or more processors may be configured to adjust the state of the unmanned carrier based on the state of the UAV. The controller may be located onboard the unmanned carrier. Alternatively, the controller may be located at the remote control terminal. In some embodiments, the controller may be implemented at both the unmanned carrier and the remote control terminal. In some alternative embodiments, the controller may be located on the UAV. The controller may be configured to adjust the state of the unmanned carrier based on the state of the UAV.

In some embodiments, the state of the unmanned carrier may comprise at least (1) a first state wherein the UAV is docked on the unmanned carrier, (2) a second state wherein the UAV is in a flight mode and separated from the unmanned carrier, (3) a third state wherein the UAV is ready to dock on the unmanned carrier, or (4) a fourth state wherein the UAV is ready to take off from the unmanned carrier.

In one example, when the UAV is docked on the unmanned carrier, one or more components of the UAV (e.g., a landing gear of the UAV) may be coupled to the unmanned carrier. One or more sensors onboard the unmanned carrier may be configured to detect the connection/coupling states between the UAV and the unmanned carrier. The coupling unit may be configured to couple to the one or more components of the UAV when the UAV is docked on the unmanned carrier. The coupling unit may be retracted into a storage space of the unmanned carrier when not in use. The storage space may be located within a housing of the unmanned carrier, or on a side/top/bottom portion of the unmanned carrier. In some cases, the storage space may be located in a separate housing that is attached to the unmanned carrier. In some embodiments, the coupling unit may extend out from the storage space to receive the UAV when the UAV is ready to dock on the unmanned carrier. Conversely, when the coupling unit releases to de-couple from the one or more components of the UAV, the UAV may be ready to take off from the unmanned carrier.

In some instances, the UAV may be in flight. When the UAV is ready to dock on the unmanned carrier (e.g., when the unmanned carrier is in the third state), the controller may send a signal to the unmanned carrier to prepare for receiving the UAV. For example, a coupling unit on the unmanned carrier may be configured to receive the UAV based on the signal.

In some other instances, the UAV may be docked on the unmanned carrier. When the UAV is ready to take off from the unmanned carrier (e.g., when the unmanned carrier is in the fourth state), the controller may send a signal to the unmanned carrier to prepare for decoupling the UAV from the unmanned carrier. In some cases, the coupling unit may be configured to retract into a storage space of the unmanned carrier after the UAV has taken off from the unmanned carrier.

In some embodiments, when the UAV is in the flight mode and separated from the unmanned carrier (e.g., when the unmanned carrier is in the second state), the controller may be configured to determine a location of the UAV. The controller may send a first signal to the unmanned carrier to move to a location on the ground for receiving the UAV. In some examples, the location on the ground may be within a predetermined range from the location of the UAV. The controller may also send a second signal to the unmanned carrier to prepare for landing of the UAV. The second signal may comprise instructions to elevate and/or open a coupling unit of the unmanned carrier to receive the UAV. In some examples, the controller may be further configured to send a third signal for adjusting a camera attached to the unmanned carrier to point at a direction of the UAV in flight. In some examples, the controller may be further configured to send a fourth signal to the UAV for descending when the unmanned carrier arrives at the location on the ground.

In some other embodiments, when the UAV is in the flight mode and separated from the unmanned carrier (e.g., when the unmanned carrier is in the second state), the controller may be configured to determine a location of the unmanned carrier. The controller may send a first signal to the UAV to fly to an aerial location substantially above the location of the unmanned carrier. The controller may also send a second signal to the UAV for descending to dock on the unmanned carrier when the UAV arrives at the aerial location. The controller may further send a third signal to the unmanned carrier to prepare for receiving the UAV.

In some embodiments, when the UAV is in the flight mode and separated from the unmanned carrier (e.g., when the unmanned carrier is in the second state), the controller may be configured to determine both a location of the unmanned carrier and a location of the UAV. The controller may determine a meeting location that is accessible to both the unmanned carrier and the UAV. The controller may send a first signal to the UAV to fly to an aerial location substantially above the meeting location. The controller may send a second signal to the unmanned carrier to move to the meeting location. The controller may send a third signal to the UAV for descending to dock on the unmanned carrier when the UAV arrives at the aerial location. The controller may send a fourth signal to the unmanned carrier to prepare for receiving the UAV.

In some embodiments, when the UAV is in the flight mode and separated from the unmanned carrier (e.g., when the unmanned carrier is in the second state), the controller may be configured to determine a location of the UAV by receiving positional data of the UAV from one or more sensors onboard the UAV. The controller may send controlling signals to the unmanned carrier to follow the UAV in flight.

In some embodiments, when the UAV is docked on the unmanned carrier (e.g., when the unmanned carrier is in the first state), the controller may be configured to send a signal to the camera 140 attached to the unmanned carrier to capture ground images. A location of the unmanned carrier may remain unchanged when the unmanned carrier changes from one state to another (e.g., from the first state to the second state).

In some embodiments, the controller may be a handheld remote control terminal. Optionally, the controller may be onboard the unmanned carrier. The controller may comprise at least one display configured to display images captured by the UAV and images captured by the unmanned carrier. The UAV images and the unmanned carrier images may be displayed simultaneously or separately on a single display or on multiple displays. In some embodiments, the UAV images and the unmanned carrier images may be complementary to each other. The controller may be configured to adjust the state of the unmanned carrier based on the images captured by the UAV and the images captured by the unmanned carrier.

In some embodiments, the controller may be configured to determine the state of the UAV, determining a relative position between the UAV and the unmanned carrier. The relative position between the UAV and the unmanned carrier may be determined based on positional data measured by one or more sensors carried by the UAV. Optionally, the relative position between the UAV and the unmanned carrier may be determined based on positional data measured by one or more sensors on the unmanned carrier.

A method for capturing images using the UAV of FIG. 1 may be provided in accordance with some embodiments. The method may be performed using a combination of hardware and/or software. For example, the method may be implemented with aid of one or more processors individually or collectively. The one or more processors may be located on the control terminal. Optionally, the one or more processors may be located on the unmanned carrier and/or the UAV. As previously described, the unmanned carrier may comprise one or more propulsion components configured to propel the unmanned carrier, a landing area configured to support the UAV when the UAV is landed on the unmanned carrier, and a coupling unit configured to releasably couple with the UAV when the UAV is borne by the landing area. The coupling unit may comprise one or more gripping structures configured to releasably lock one or more landing gears of the UAV on the landing area.

Figure 3:
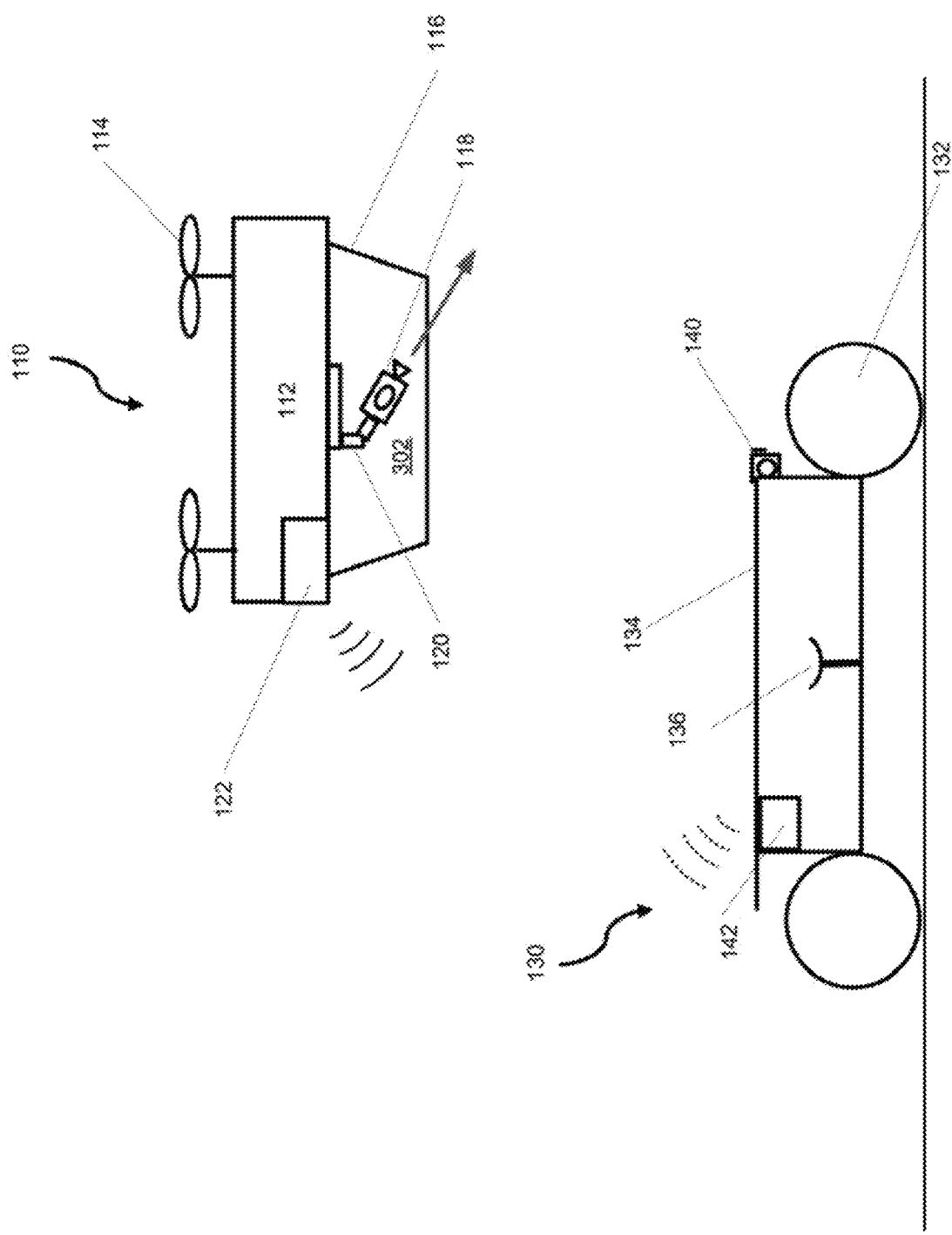
FIG. 3 is a schematic showing a UAV camera in a second state when the UAV in a flight mode, in accordance with some embodiments.

The method may comprise determining whether the UAV is in a ground mode or a flight mode. FIG. 2 shows an example of the UAV in a ground mode, and FIG. 3 shows an example of the UAV in a flight mode. Referring to FIG. 2, the UAV may be in the ground mode when the weight of the UAV is borne by the unmanned carrier which is configured to carry the UAV. Referring to FIG. 3, the UAV may be in the flight mode when the UAV is released from the unmanned carrier. In some embodiments, the UAV may be in the ground mode when the UAV is beneath a predetermined altitude threshold. Conversely, the UAV may be in the flight mode when the UAV is above the predetermined altitude threshold. The predetermined altitude threshold may or may not be defined by an operator/user of the unmanned carrier and/or the UAV. The predetermined altitude threshold may be defined by any altitude level. The predetermined altitude threshold may or may not be defined relative to the unmanned carrier. In some cases, the predetermined altitude threshold may be defined at an altitude level of the landing area of the unmanned carrier. Optionally, the predetermined altitude threshold may be defined at a predefined height above the landing area of the unmanned carrier. The predetermined altitude threshold may be constant. For example, when the unmanned carrier is traversing on a flat terrain, the predetermined altitude threshold may be constant. Optionally, the predetermined altitude threshold may be dynamically changing. For example, when the unmanned carrier is traversing on terrain having different elevations, the predetermined altitude threshold may change based on the different elevations.

The UAV may be switched between the ground mode and the flight mode in accordance with a signal received from the control terminal. The communication component 122 of the UAV may be configured to receive the signal from the control terminal with respect to switching between the ground mode and the flight mode. The UAV may be switched between the ground mode and the flight mode based on relative position information between the UAV and the unmanned carrier. The relative position information may be determined based on positional data measured by one or more sensors carried by the UAV. Optionally, the relative position information may be determined based on positional data measured by one or more sensors on the unmanned carrier.

The signal from the control terminal may be indicative of the relative state which may include relative position information between the UAV and the unmanned carrier. The relative position information may be determined based on positional data measured by one or more sensors carried by the UAV. Optionally, the relative position information may be determined based on positional data measured by one or more sensors on the unmanned carrier.

In some embodiments, the unmanned carrier may comprise a positioning sensing device configured to obtain positioning data of the unmanned carrier. The positioning data may be provided from the unmanned carrier to the UAV before the UAV docking. The positioning data may also be provided to the control terminal for remotely controlling navigation of the unmanned carrier. The positioning data may be provided to the UAV via one or more communication components, either wirelessly or wired, prior to the UAV docking on the unmanned carrier. In some cases, the positioning data may be provided to the control terminal, such that a user or operator at the control terminal can use the positioning data to remotely control navigation of the unmanned carrier.

The UAV may be configured to carry a camera 118. The camera may be attached to a gimbal (support platform 120) mounted on the UAV. The camera carried by the UAV may be herein referred to as "UAV camera." The method may include automatically adjusting a state of the UAV camera to have a first state when the UAV is in the ground mode, and a second state when the UAV is in the flight mode. FIG. 2 shows an example of the UAV camera having a first state 202 when the UAV is in the ground mode. FIG. 3 shows an example of the UAV camera having a second state 302 when the UAV is in the flight mode. The state of the UAV camera may include a position of the UAV camera, orientation of the UAV camera about one or more axes, zoom in/out of the UAV camera, and/or power on/off the UAV camera. One or more of the above characteristics or functionalities of the UAV camera may be different between the first state and the second state. As shown in FIGS. 2 and 3, the UAV camera may have different orientations in the first and second states.

For example, the UAV camera may be pitched at a first angle when the UAV camera is in the first state, and pitched at a second angle when the UAV camera is in the second state. The first and second angles may be different, as described below.

In some embodiments, automatically adjusting the state of the UAV camera may include adjusting an angle of the UAV camera relative to the direction of gravity. In some cases, the angle of the UAV camera may be in a range from about 70° to about 90° when the UAV camera is in the first state. For example, the angle of the UAV camera may be about 70°, 75°, 80°, 85°, or 90° when the UAV camera is in the first state. Alternatively, the angle of the UAV camera may be less than 70° or greater than 90° when the UAV camera is in the first state. In some cases, the angle of the UAV camera may be in a range from about 0° to about 30° when the UAV camera is in the second state. For example, the angle of the UAV camera may be about 0°, 5°, 10°, 15°, 20°, 25°, or 30° when the UAV camera is in the second state. Alternatively, the angle of the UAV camera may be greater than 30° when the UAV camera is in the second state. In some cases, the camera may be configured to shoot (or capable of shooting) 360° panoramic views. The angle of the UAV camera may be adjusted instantaneously when the UAV changes from the first state to the second state. Alternatively, the angle of the UAV camera may be adjusted gradually when the UAV camera changes from the first state to the second state. Similarly, the angle of the UAV camera may be adjusted instantaneously when the UAV changes from the second state to the first state. Alternatively, the angle of the UAV camera may be adjusted gradually when the UAV camera changes from the second state to the first state.

In some embodiments, the method may further include controlling the UAV camera to capture images using the UAV camera in the first state when the UAV is in the ground mode and the second state when the UAV is in the flight mode. In some cases, the images captured by the UAV camera may be transmitted directly from the UAV camera (or via the communication component 122 on the UAV) to the control terminal. The captured images may be subsequently stored and/or displayed on the control terminal.

The unmanned carrier may be configured to carry a camera 140. The camera carried by the unmanned carrier may be herein referred to as "unmanned carrier camera." The unmanned carrier camera may be configured to capture images of ground environment and/or the UAV in the flight mode. The images captured by the unmanned carrier camera and the images captured by the UAV camera may be respectively transmitted to the control terminal. One or more of the images may be displayed on the control terminal. The images from the unmanned carrier and the images from the UAV may be complementary to each other. In some cases, the images from the unmanned carrier and the images from the UAV may be consolidated at the control terminal.

In some embodiments, a system for capturing images using an unmanned aerial vehicle (UAV) is provided. The system may comprise a state determination module, a camera adjusting module, and a camera controlling module. Each of the above modules may be implemented using a combination of hardware and/or software, with aid of one or more processors individually or collectively. One or more of the above modules may be located at the control terminal, the unmanned carrier, and/or the UAV.

The state determination module may be configured to determine whether the UAV is in a ground mode or a flight mode. The UAV may be configured to carry a camera. The camera adjusting module may be configured to automatically adjust a state of the camera to have a first state when the UAV is in the ground mode and a second state when the UAV is in the flight mode. The UAV may be in the ground mode when the weight of the UAV is borne by an unmanned carrier which is configured to carry the UAV. The UAV may be in the flight mode when the UAV is released from the unmanned carrier. The camera controlling module may be configured to control the camera to capture images in the first state when the UAV is in the ground mode and the second state when the UAV is in the flight mode.

A method for capturing images using an unmanned carrier may be provided in some embodiments. The method may comprise determining a relative state between the UAV and the unmanned carrier. The UAV may be capable of landing on the unmanned carrier or taking off from the unmanned carrier for flight. As previously described, the unmanned carrier may be configured to carry a camera ("unmanned carrier camera"). The method may be performed using a combination of hardware and/or software. For example, the method may be implemented with aid of one or more processors individually or collectively. The one or more processors may be located on the control terminal. Optionally, the one or more processors may be located on the unmanned carrier and/or the UAV. The unmanned carrier may comprise one or more propulsion components configured to propel the unmanned carrier, a landing area configured to support the UAV when the UAV is landed on the unmanned carrier, and a coupling unit configured to releasably couple with the UAV when the UAV is borne by the landing area.

Figure 4:
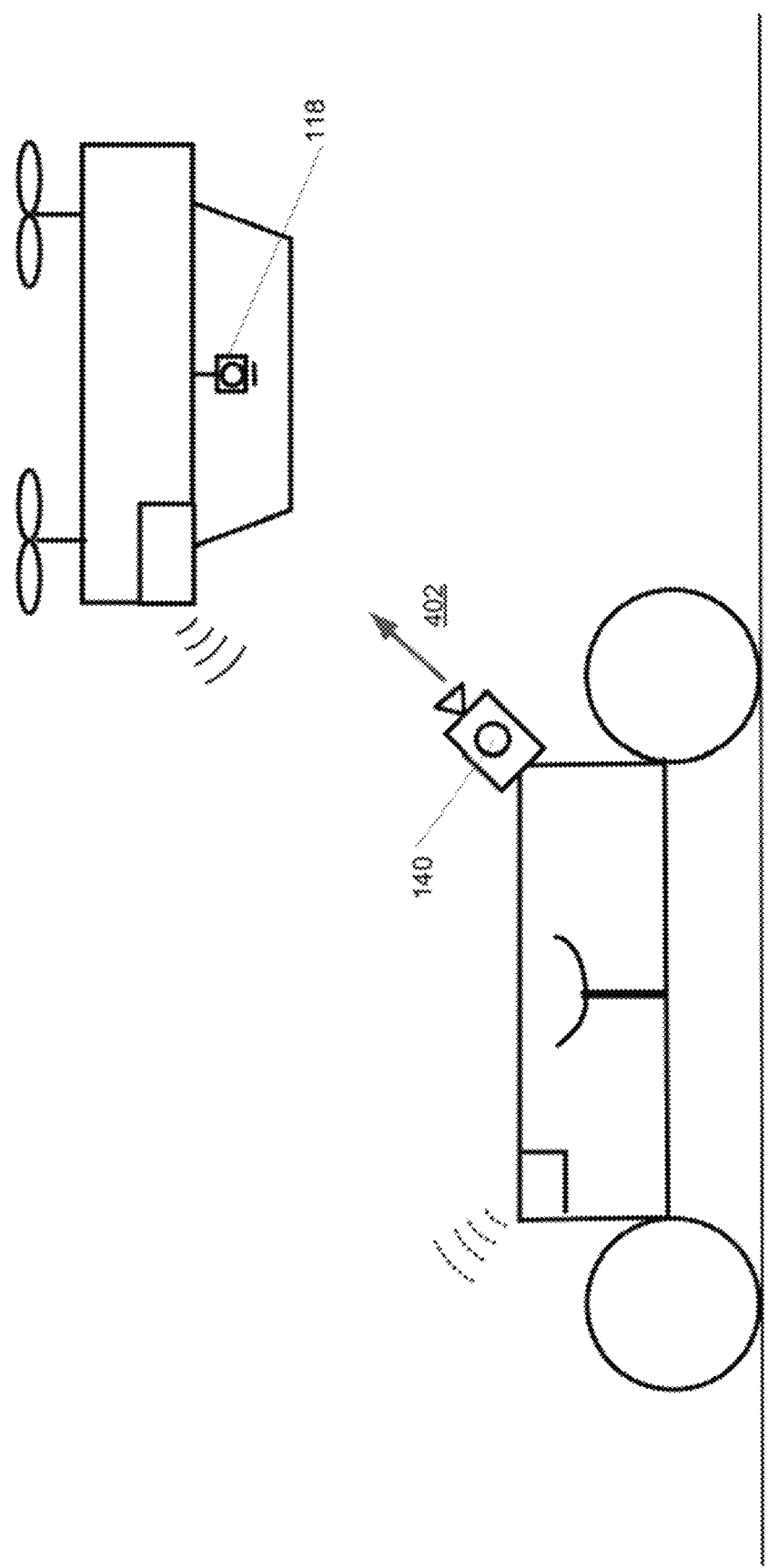
FIG. 4 is a schematic showing an unmanned carrier camera pointing at a UAV while the UAV is in flight, in accordance with some embodiments.

The method may further comprise adjusting a state of the unmanned carrier camera based on the determined relative state, and controlling the unmanned carrier camera to capture one or more images. The state of the unmanned carrier camera may include a position of the unmanned carrier camera, orientation of the unmanned carrier camera about one or more axes, zoom in/out of the unmanned carrier camera, and/or power on/off of the unmanned carrier camera. In some embodiments, adjusting the state of the unmanned carrier camera may comprise adjusting an angle of the unmanned carrier camera to be pointing 402 at the UAV while the UAV is in flight, for example as shown in FIG. 4. Additionally, adjusting the state of the unmanned carrier camera may comprise adjusting an angle of the unmanned carrier camera to be pointing in a direction of an anticipated flight path of the UAV while the UAV is landed on the unmanned carrier, and prior to the UAV taking off from the unmanned carrier.

Figure 5:
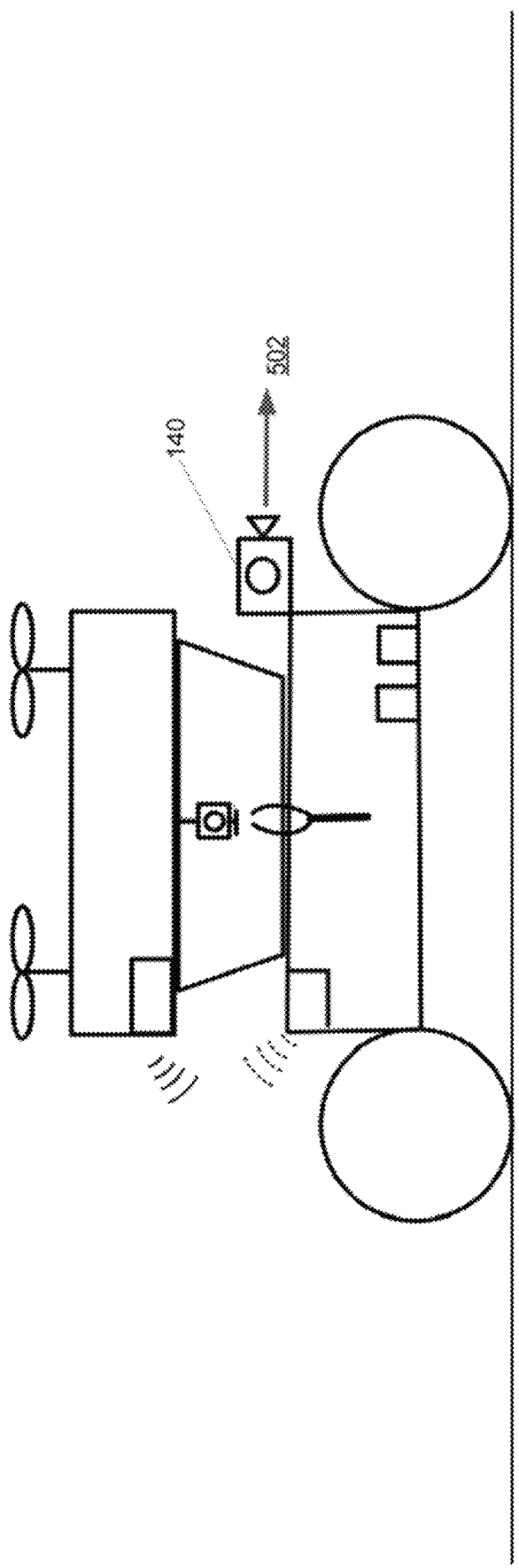
FIG. 5 is a schematic showing an unmanned carrier camera capturing ground images while the UAV is docked to the unmanned carrier, in accordance with some embodiments.

In some embodiments, the control terminal may be configured to determine that the UAV is coupled to the unmanned carrier and is not planning on taking off. In those embodiments, the state of the unmanned carrier camera may be adjusted such that the unmanned carrier camera is configured to capture ground images. The unmanned carrier camera may be pointing in a forward or side direction 502 when capturing ground images, for example as shown in FIG. 5. The unmanned carrier camera may be further configured to capture images when the unmanned carrier traverses various physical terrain or environments (e.g., bodies of water, land, forests, or deserts).

The unmanned carrier may comprise one or more communication components 142. The one or more communication components may be configured to relay signals transmitted between the UAV and the control terminal. The one or more communication components may include a transmitter configured to transmit the images captured by the unmanned carrier camera to the control terminal. In some cases, the transmitter may be further configured to transmit images captured by the UAV camera to the control terminal. The control terminal may be configured to receive the images captured by the UAV camera and/or the unmanned carrier camera. The UAV camera images and the unmanned carrier camera images may be complementary to each other and consolidated at the control terminal. In some cases, the unmanned carrier may include one or more sensors configured to collect environment data as the unmanned carrier traverses various environments. The collected environment data may be transmitted to the control terminal via the one or more communication units. In some instances, the collected environment data may be transmitted from the unmanned carrier to the control terminal in real-time. The captured images may be used for assisting operations of the unmanned carrier at the control terminal. The UAV camera and/or the unmanned carrier camera may be configured to capture images when the unmanned carrier traverses various environments. The unmanned carrier may further comprise one or more sensors configured to collect environment data as the unmanned carrier traverses the various environments. The collected environment data may be transmitted to the control terminal in real time.

The unmanned carrier may also be configured to receive control signals from the control terminal. The control signals can be used to control operation of the unmanned carrier. In some embodiments, the control signals may be generated based on the captured images. As previously described, the captured images may include environmental data or information.

In some embodiments, an apparatus for capturing images using an unmanned carrier may be provided. The apparatus may comprise one or more processors that are individually or collectively configured to determine a relative state between an unmanned aerial vehicle (UAV) and the unmanned carrier. The UAV may be capable of landing on the unmanned carrier or taking off from the unmanned carrier for flight. The unmanned carrier may be configured to carry a camera. The apparatus may be further configured to generate a first signal for adjusting the state of the camera attached to the unmanned carrier based on the state of the UAV, and generate a second signal for controlling the camera to capture images.

Figure 6:
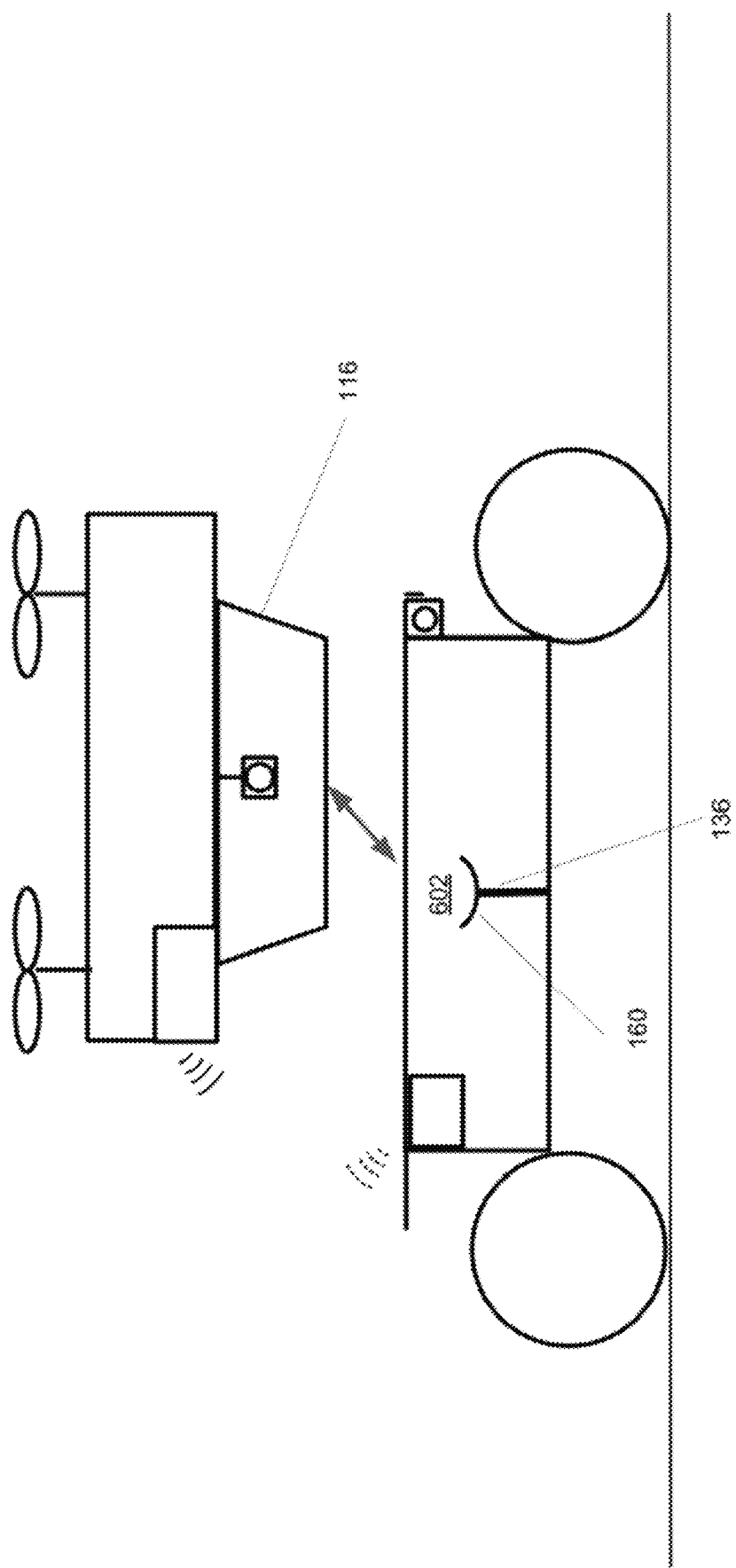
FIG. 6 is a schematic showing a UAV in flight as it prepares to dock on an unmanned carrier, in accordance with some embodiments.
Figure 7:
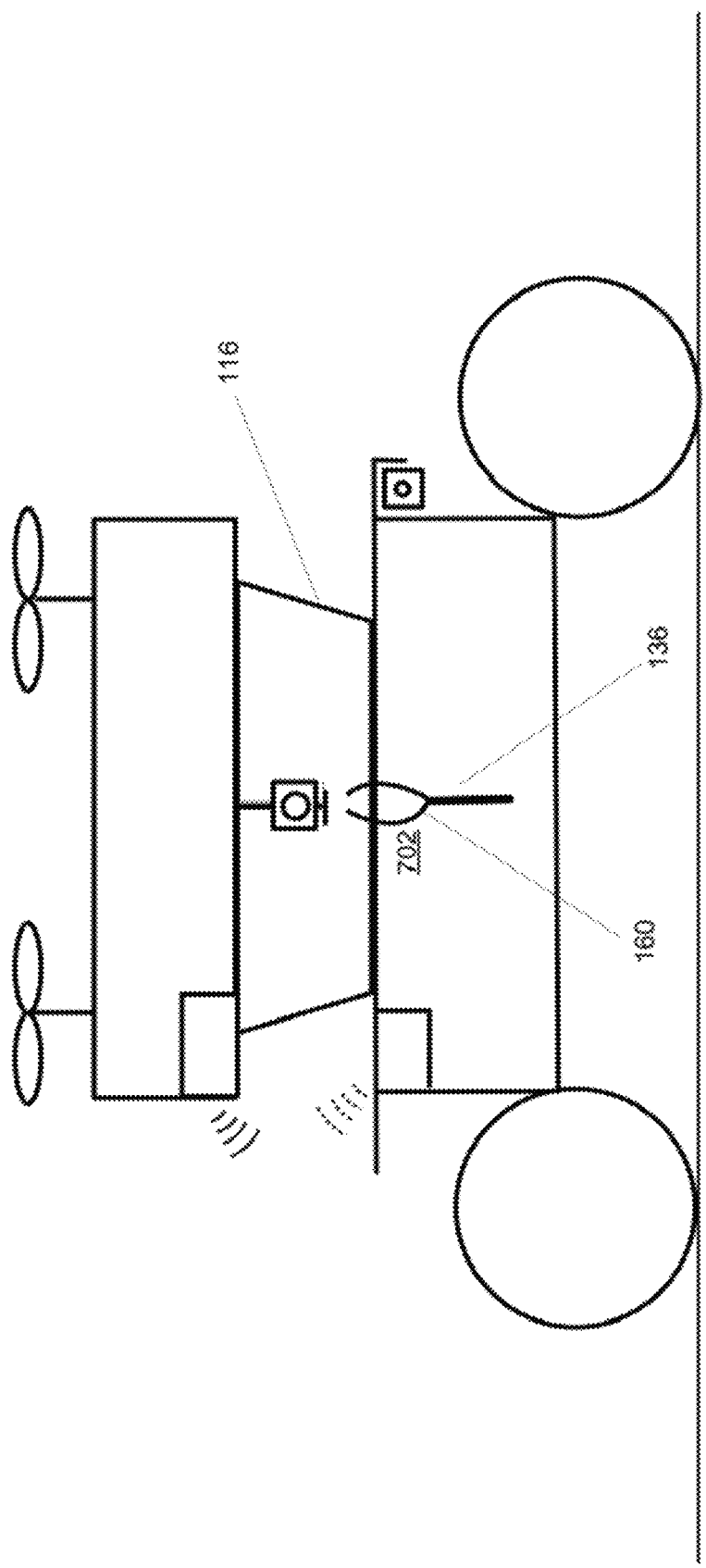
FIG. 7 is a schematic showing a UAV docked on an unmanned carrier, in accordance with some embodiments.

FIGS. 6 and 7 are illustrative views showing docking of a UAV on an unmanned carrier, in accordance with some embodiments. Specifically, FIG. 6 is a schematic showing the UAV preparing to dock on the unmanned carrier, and FIG. 7 is a schematic showing the UAV docked on the unmanned carrier.

A method for docking an unmanned aerial vehicle (UAV) on an unmanned carrier may be provided in accordance with some embodiments. The method may comprise operating one or more propulsion components to propel the unmanned carrier, receiving signals related to docking of the UAV on the unmanned carrier, and preparing a coupling unit of the unmanned carrier for receiving the UAV. The coupling unit may be configured to couple to one or more landing gears of the UAV. A system for docking the UAV on the unmanned carrier may be provided in accordance with embodiments of the disclosure. The system may comprise a power control module configured to control one or more propulsion units to propel the unmanned carrier, a communication module configured to receive signals related to docking the UAV on the unmanned carrier, and a docking module configured to prepare a coupling unit of the unmanned carrier for receiving the UAV, wherein the coupling unit is configured to couple to one or more landing gears of the UAV. One or more of the power control module, the communication module, and the docking module may be located on the unmanned carrier.

The signals related to docking of the UAV may comprise a first group of signals related to moving the unmanned carrier to a designated location for receiving the UAV. The first group of signals may be received from the control terminal by a communication component of the unmanned carrier. The first group of signals may comprise notifications/instructions for the unmanned carrier to move to the designated location for receiving the UAV. The first group of signals may comprise navigation information to guide the unmanned carrier to move to the designated location. A navigation module of the unmanned carrier may be configured to compute navigation information based on a location of the designated location for the unmanned carrier to move to the designated location. The first group of instructions may comprise UAV position data. One or more processors of the unmanned carrier may be individually or collectively configured to (i) determine the designated location and (ii) calculate the navigation information based on the UAV position/determined designated location.

The first group of signals may be received from the UAV by one or more sensors or a communication component at the unmanned carrier. The first group of signals may include location data of the UAV. In some embodiments, the method for docking the UAV on the unmanned carrier may further comprise collecting position data of the unmanned carrier using a positioning device on the unmanned carrier, processing the first group of signals received from the UAV to obtain relative location information between the UAV and the unmanned carrier, and generating navigation information for the unmanned carrier to move to the designated location for receiving the UAV.

In some embodiments, the method may further comprise capturing images using the camera attached to the unmanned carrier, transmitting captured images to the control terminal, and receiving navigation instructions generated with assist of the captured images from the control terminal. The signals related to docking the UAV may comprise a second group of signals indicating the UAV is within a dockable range of the unmanned carrier. The dockable range may be within a predetermined range from a center of a landing area of the unmanned carrier. In some embodiments, a third group of signals may be sent from the unmanned carrier to the UAV, to notify the UAV to start descending toward a landing area of the unmanned carrier, for example as shown in FIG. 6.

As previously described, the coupling unit of the unmanned carrier may be prepared for receiving the UAV. Preparing the coupling unit may comprise elevating the coupling unit of the unmanned carrier to couple with the UAV when the UAV is within the dockable range. Preparing the coupling unit may comprise having a gripping structure 160 of the coupling unit change from an open state 602 (e.g., as shown in FIG. 6) to a closed state 702 (e.g., as shown in FIG. 7) to lock a portion of the UAV when the UAV is within the dockable range. The portion of the UAV to be locked may correspond to a landing gear 116 of the UAV. In some instances, preparing the coupling unit may comprise elevating the coupling unit while simultaneously changing a gripping structure of the coupling unit from an open state (e.g., shown in part B of FIG. 10) to a closed state (e.g., as shown in part A of FIG. 10) to lock a portion of the UAV when the UAV is within the dockable range.

In one implementation, the UAV may have an on-board UAV energy storage unit and the unmanned carrier may have an on-board vehicle energy storage unit. An energy storage unit may include one or more batteries. In some instances, the energy storage may be a battery pack. The battery pack may include one or more batteries connected in series, in parallel, or any combination thereof. An energy storage unit of the UAV may power one or more components of the UAV. An energy storage unit of the unmanned carrier may power one or more components of the unmanned carrier. For example, the energy storage unit of the unmanned carrier may also power one or more propulsion components of the unmanned carrier. In one example, the energy storage unit may be a vehicle battery. In other instances, the energy storage unit may be a battery pack on-board the unmanned carrier that is not used to power any other components of the unmanned carrier.

Any energy storage unit may have one or more batteries. Batteries having any battery chemistry known or later developed in the art may be used. In some instances, batteries may be lead acid batteries, valve regulated lead acid batteries (e.g., gel batteries, absorbed glass mat batteries), nickel-cadmium (NiCd) batteries, nickel-zinc (NiZn) batteries, nickel metal hydride (NiMH) batteries, or lithium-ion (Li-ion) batteries. The battery cells may be connected in series, in parallel, or any combination thereof. The battery cells may be packaged together as a single unit or multiple units. The batteries may be rechargeable batteries.

When a UAV is in flight, the UAV may be discharging the UAV energy storage unit. When the UAV is docked with the unmanned carrier, the UAV may form a connection between the UAV energy storage unit and the unmanned carrier energy storage unit. The unmanned carrier energy storage unit may be used to charge the UAV energy storage unit. In one example, when the UAV lands on the unmanned carrier, a state of charge of the UAV energy storage may be assessed. The unmanned carrier may charge the UAV when the state of charge of the UAV has dropped beneath a threshold value. The unmanned carrier may charge the UAV when the UAV is not fully charged. In other instances, the unmanned carrier may automatically charge the UAV energy storage unit regardless of state of charge of the UAV energy storage units. The unmanned carrier energy storage unit may be charged when the unmanned carrier is in motion. In some embodiments, the unmanned carrier may be capable of charging the UAV when the UAV is within a chargeable range of the unmanned carrier. The charging may occur via a physical connection between the UAV and the unmanned carrier. In other instances, inductive charging may be used. Thus, an advantage may be provided by the system where the UAV may be charged while the unmanned carrier is on the go and the UAV may be launched as needed. This may permit a UAV to take off from the unmanned carrier multiple times while the unmanned carrier is traveling.

In some cases, the unmanned carrier may comprise a charging unit configured to charge a battery of the UAV when the UAV is within the chargeable range of the charging unit. The UAV may be charged by a connection between the UAV and the unmanned carrier when the UAV is landed on the unmanned carrier. Alternatively, the UAV may be charged using a wireless charging technology when the UAV is within the chargeable range. The unmanned carrier may be configured to directly provide power to the UAV.

A UAV may be capable of flying for any length of time on a full charge of the UAV's energy storage unit. For example, the UAV may be capable of greater than or equal to about 10 hours, 9 hours, 8 hours, 7 hours, 6 hours, 5 hours, 4 hours, 3.5 hours, 3 hours, 2.5 hours, 2 hours, 1.5 hours, 1 hour, 55 minutes, 50 minutes, 45 minutes, 40 minutes, 35 minutes, 30 minutes, 25 minutes, 20 minutes, 15 minutes, 10 minutes, 5 minutes, 3 minutes, or 1 minute of continuous flight on a full charge. Alternatively, the UAV may only be capable of flying for less than any of the times mentioned herein. Alternatively, the UAV may be capable of flight in a range of time falling between any two of the values described herein. The flight time may be while the UAV is performing flying functions alone. The flight time may include the UAV transmitting image data or other types of data from a payload or sensors while the UAV is in flight.

The unmanned carrier may be capable of charging the UAV quickly. For example, the UAV may be charged from a fully discharged state to a fully charged station within about 8 hours, 7 hours, 6 hours, 5 hours, 4.5 hours, 4 hours, 3.5 hours, 3 hours, 2.5 hours, 2 hours, 1.5 hours, 1 hour, 45 minutes, 30 minutes, 20 minutes, 15 minutes, 12 minutes, 10 minutes, 8 minutes, 7 minutes, 6 minutes, 5 minutes, 4 minutes, 3 minutes, 2 minutes, 1 minute, 30 seconds, or 10 seconds. Alternatively, the charging may take longer than any of the time values provided herein. The charging may occur within a range of time falling between any two of the values described herein. In some instances, the charging time may be less than the flight time. In other instances, the charging time may be greater or equal to the flight time. The ratio between charging time and flight time may be about 10:1, 8:1, 6:1, 5:1, 4:1, 3:1, 2:1, 1:1, 1:2, 1:3, 1:4, 1:5, 1:6, 1:8, or 1:10.

The unmanned carrier may be capable of charging the UAV with any voltage and/or current input. In some instances, the UAV energy storage unit may receive a charging voltage corresponding to a charging voltage of the unmanned carrier battery. For example, if the unmanned carrier uses a 12 V battery, the UAV energy storage unit may be charged at 12 V. In other examples, about 1 V, 3 V, 5 V, 7 V, 10 V, 12 V, 14 V, 16 V, 18 V, 20 V, 24 V, 30 V, 36 V, 42 V, or 48 V may be employed.

In alternative embodiments, the UAV energy storage unit may be a battery pack that may be removable from the UAV. In some examples, the unmanned carrier may have another battery pack that may be swapped out with the battery pack of the UAV. The unmanned carrier may have one or more components that may permit automated swapping out of the battery packs without requiring human intervention. A robotic arm or other feature may be used to swap the battery packs.

One or more battery packs may be stored on board the unmanned carrier. The battery packs may be charged while being stored on the unmanned carrier. In some instances, the battery packs for the UAV may be charged by a battery of the unmanned carrier while the unmanned carrier is operation. The unmanned carrier may be stationary or in motion while it is in operation. In some instances, a renewable energy source may be used to charge the battery packs of the UAV. For example, solar power may be employed to charge the battery packs of the UAV.

The battery packs may thus be in a fully charged or partially charged state when they are swapped out with a depleted battery of the UAV. In some instances, an assessment may be made of the state of charge of the battery of the UAV when the UAV docks with the unmanned carrier. In some embodiments, depending on the state of charge, the UAV battery may be charged, or the UAV battery may be swapped out for a new one. In some instances, the state of charge of the new batteries may be assessed as well.

In some embodiments, a method for de-docking the UAV from the unmanned carrier may be provided. The method may comprise receiving signals related to releasing the UAV from the unmanned carrier, and preparing the coupling unit of the unmanned carrier for releasing the UAV. Preparing the coupling unit for releasing the UAV may comprise lowering the coupling unit on the unmanned carrier to unlock the UAV when the UAV is ready to take off from the unmanned carrier. The method for UAV de-docking may further comprise detecting an environment and determining whether the environment is suitable for the UAV to take off prior to lowering the coupling unit to unlock the UAV.

Figure 8:
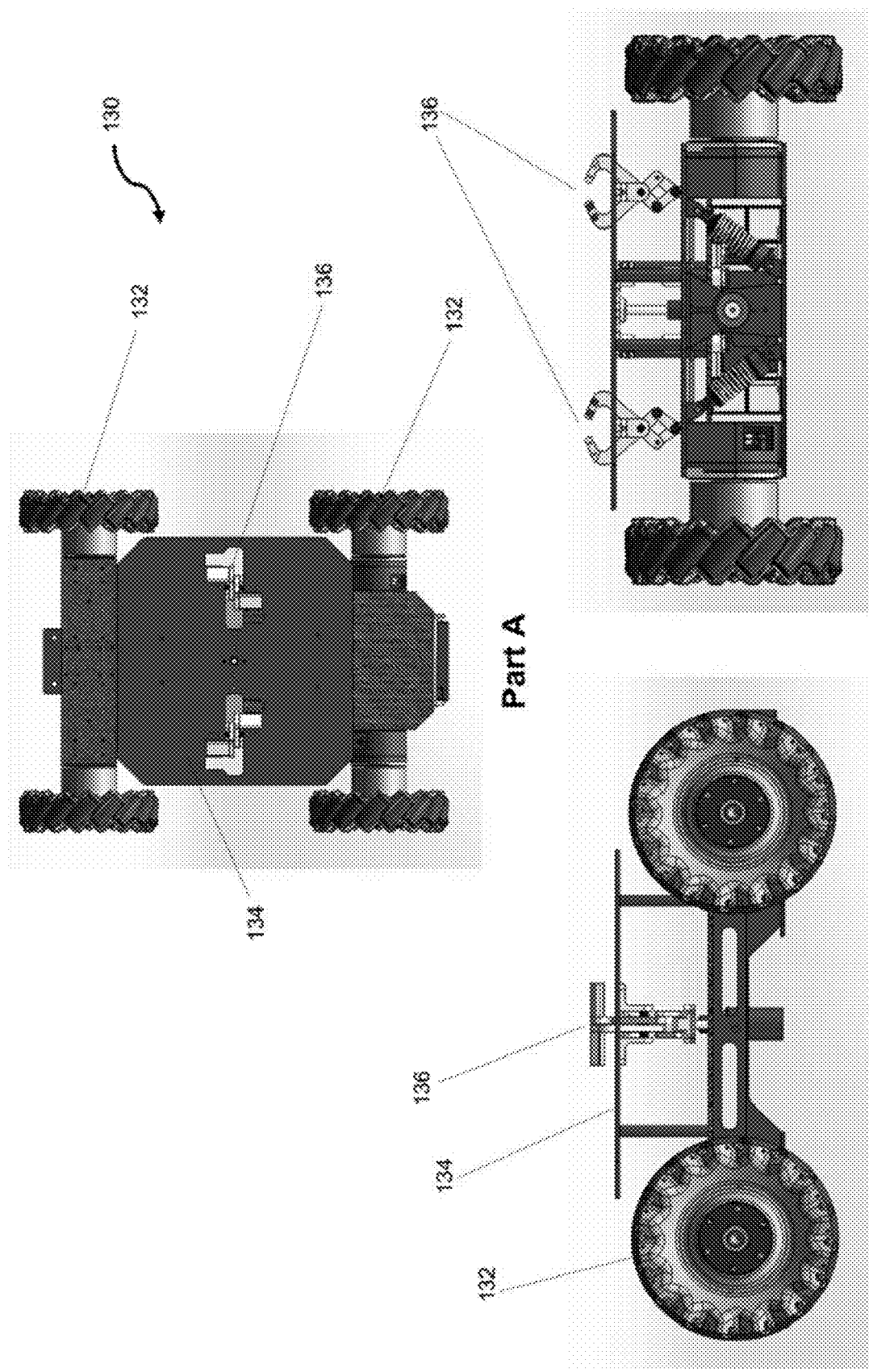
FIG. 8 illustrates different schematic views of an unmanned carrier, in accordance with some embodiments.

FIG. 8 illustrates different schematic views of an unmanned carrier, in accordance with some embodiments. Parts A, B, and C respectively show a top view, side view, and front view of an unmanned carrier 130. The unmanned carrier may be configured to carry a UAV.

The unmanned carrier may comprise a landing area 134 configured to support a UAV (not shown) when the UAV is landed on the unmanned carrier. The landing area may be a platform. In some instances, the unmanned carrier may further comprise a housing unit configured to at least partially enclose the UAV when the UAV docks on the platform.

The unmanned carrier may also comprise a coupling unit 136 configured to releasably couple with one or more landing gears of the UAV when the UAV is supported by the landing area. The unmanned carrier may also comprise one or more propulsion components 132 configured to propel the unmanned carrier. A method for carrying the UAV on the unmanned carrier may be provided. The method may comprise providing a landing area configured to support the UAV when the UAV is landed on the unmanned carrier, providing a coupling unit configured to releasably couple with one or more landing gears of the UAV when the UAV is supported by the landing area, and propelling the unmanned carrier using one or more propulsion components.

In the example of FIG. 8, the unmanned carrier may comprise a four-wheel chassis. The one or more propulsion components 132, landing area 134, and coupling unit 136 may be disposed on or operably coupled to the four-wheel chassis.

The one or more propulsion components may be powered by a battery system. The one or more propulsion components may comprise: rear wheels powered by a motor; front wheels configured to control the rotation of the unmanned carrier; and independent suspension shock proof for each wheel to decrease the shock. Power to the chassis is provided by the battery system powering the motor. The motor may drive the rear-wheel to rotate by a transmission gear. The front wheel may control the rotation of the chassis through the steering engine or motor.

The four-wheel chassis in FIG. 8 may have a relatively large turning radius, and may be suitable for primarily capturing images while the chassis is moving in a straight line. To improve the turning radius and enable image capture in a tight space, a four-wheel omnidirectional chassis may be used for the unmanned carrier in some embodiments.

In a four-wheel omnidirectional chassis, the one or more propulsion components may comprise four wheels, and each wheel may be a 45 degree omnidirectional wheel controlled by a motor. A direction of the unmanned carrier may be controlled via distribution of rotation speed among the plurality of wheels. The one or more propulsion components may further comprise an independent suspension shock proof for each wheel to decrease the shock. The chassis may be translated in any directions by different distribution of the rotation speed among the four wheels. The four-wheel omnidirectional chassis may provide good maneuverability, omnidirectional movement, and the capability to capture images while moving under tight space constraints.

In some embodiments, a three-wheel omnidirectional chassis may be used for the unmanned carrier. In a three-wheel omnidirectional chassis, the one or more propulsion components may comprise three wheels and each wheel may be a 90 degree omnidirectional wheel. The three wheels may be aligned along a circle with an angle of substantially 120 degree between adjacent wheels. The one or more propulsion components may further comprise a vertical suspension shock proof to decrease the vibration. The four-wheel omnidirectional chassis may provide good maneuverability, omnidirectional movement, and the capability to capture images while moving under tight space constraints.

In some embodiments, a crawler-type chassis may be may be used for the unmanned carrier. In a crawler-type chassis, the one or more propulsion components may comprise two continuous bands of treads distributed on two sides respectively. Each continuous band of treads may be driven by one or more wheels. The one or more propulsion components may further comprise an auxiliary support wheel configured to conduct vertical shock proof. The wheels on each of the left side and right side may be driven by a motor, similar to a differential chassis. The crawler-type chassis may provide good cross-country capability.

In some embodiments, a multi-legged chassis may be used for the unmanned carrier. In a multi-legged chassis, the one or more propulsion components may comprise a plurality of legs powered by a motor. The multi-legged chassis may provide good cross-country capability.

Figure 9:
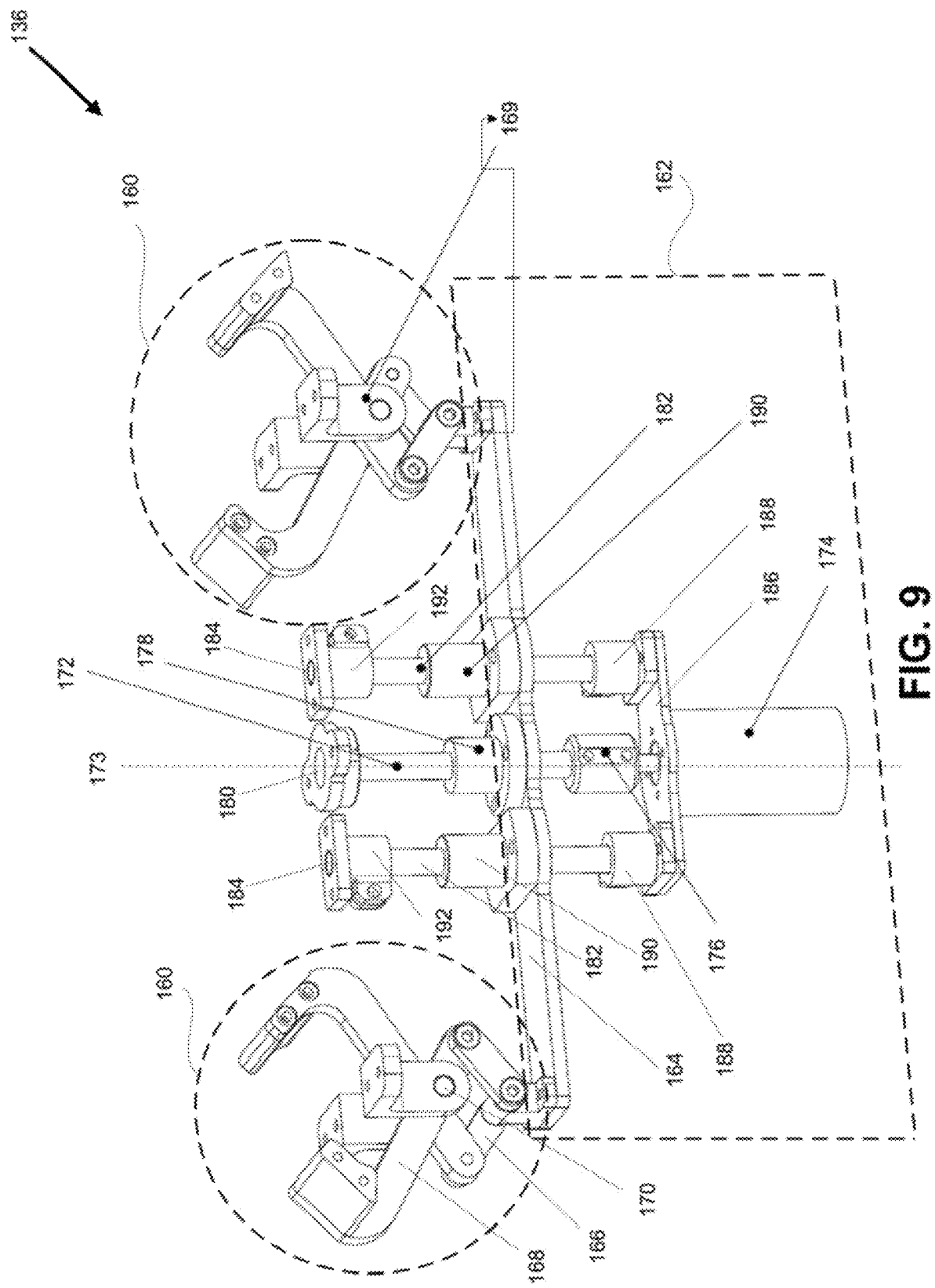
FIGS. 9 and 10 illustrate different schematic views of a coupling unit, in accordance with some embodiments.
Figure 10:
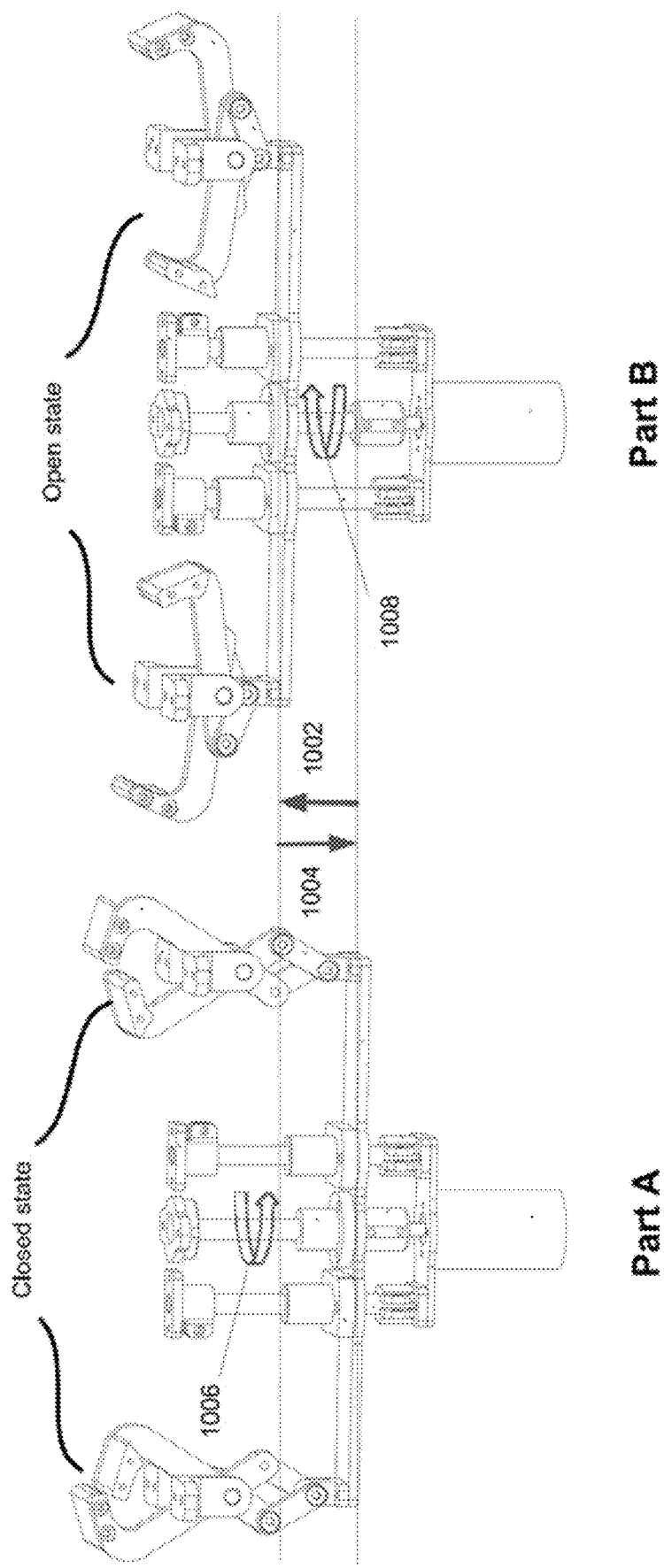

Next, the coupling unit 136 shown in FIG. 8 will be described in further detail with reference to FIGS. 9 and 10. FIGS. 9 and 10 illustrate different schematic views of the coupling unit in accordance with some embodiments. The coupling unit may be configured to couple/de-couple with one or more components of a UAV.

The coupling unit may be configured to keep a UAV attached to the unmanned carrier while the unmanned carrier is in motion. In some embodiments, the coupling unit may be configured to prevent detachment of the UAV from the unmanned carrier while the unmanned carrier is moving at a speed, for example between 1 m/s and 2 m/s, less than 1 m/s, or greater than 2 m/s.

The coupling unit may comprise one or more gripping structures 160 configured to lock or unlock one or more landing gears at a bottom of the UAV. The coupling unit may allow the UAV to dock within a dockable range from a landing area of an unmanned carrier. The dockable range may be within a predetermined range from a center of the landing area.

In the embodiment of FIG. 9, a coupling unit 136 may comprise an elevating unit 162 comprising a horizontal bar 164 connected to a pair of gripping structures 160. Each gripping structure may comprise a four-bar linkage 166 connected to a pair of claws 168 to form a scissor linkage. A top hinge 170 of the four-bar linkage may be fixedly connected to a landing area (not shown) such that when the horizontal bar elevates in direction 1002 shown in FIG. 10, the four-bar linkage moves to open the claws. Similarly, when the horizontal bar lowers in direction 1004 shown in FIG. 10, the four-bar linkage moves to close the claws. Each gripping structure may comprise a gripper stand 169. A portion of a UAV may be supported by the gripper stand when the coupling unit is coupled to the UAV.

The elevating unit may comprise a vertical screw rod 172 coupled to a motor 174 via a coupling element 176. The horizontal bar may be attached to the screw rod via a screw nut 178. The horizontal bar may be rigidly coupled to the screw nut. The motor may be located below a landing area of the unmanned carrier. A base stand 180 may be disposed on one end of the screw rod. The base stand may be configured to support the landing area of the unmanned carrier.

Referring to part A of FIG. 10, the motor may be configured to rotate the screw rod in a first direction 1006. Rotation of the screw rod in the first direction may lower the horizontal bar in direction 1004, which also simultaneously closes the claws of the gripping structures to lock the UAV when the claws are in the closed state. Referring to part B of FIG. 10, the motor may be configured to rotate the screw rod in a second direction 1008. Rotation of the screw rod in the second direction may elevate the horizontal bar in direction 1002, which also simultaneously opens the claws of the gripping structures to unlock the UAV when the claws are in the open state. The first direction 1006 and the second direction 1008 may be opposite to each other. For example, in some embodiments, the first direction may be a counter-clockwise direction, and the second direction may be a clockwise direction.

In the example of FIG. 9, the horizontal bar is configured to translate along a longitudinal axis 173 of the screw rod when the screw rod is being rotated by the motor. To convert the rotational motion into a translational motion, a pair of supporting rods 182 may be provided to prevent the horizontal bar from rotating. The pair of supporting rods may be rigidly held in place by base mounts 184 located on one end of the supporting rods. The other end of the supporting rods may be coupled to the body of the motor 174 via a plate 186 and coupling elements 188. The horizontal bar may be attached to the supporting rods via screw nuts 190, such that the horizontal bar is capable of sliding along the supporting rods. The base mounts 184 may also be configured to support a landing area of the unmanned carrier (not shown). In some embodiments, locking collars 192 may be provided on the supporting rods. The locking collars may be rigidly connected to one or more parts of the unmanned carrier (e.g., a landing area of the carrier) using one or more fastening elements, in order to hold the supporting rods in place.

Figure 11:
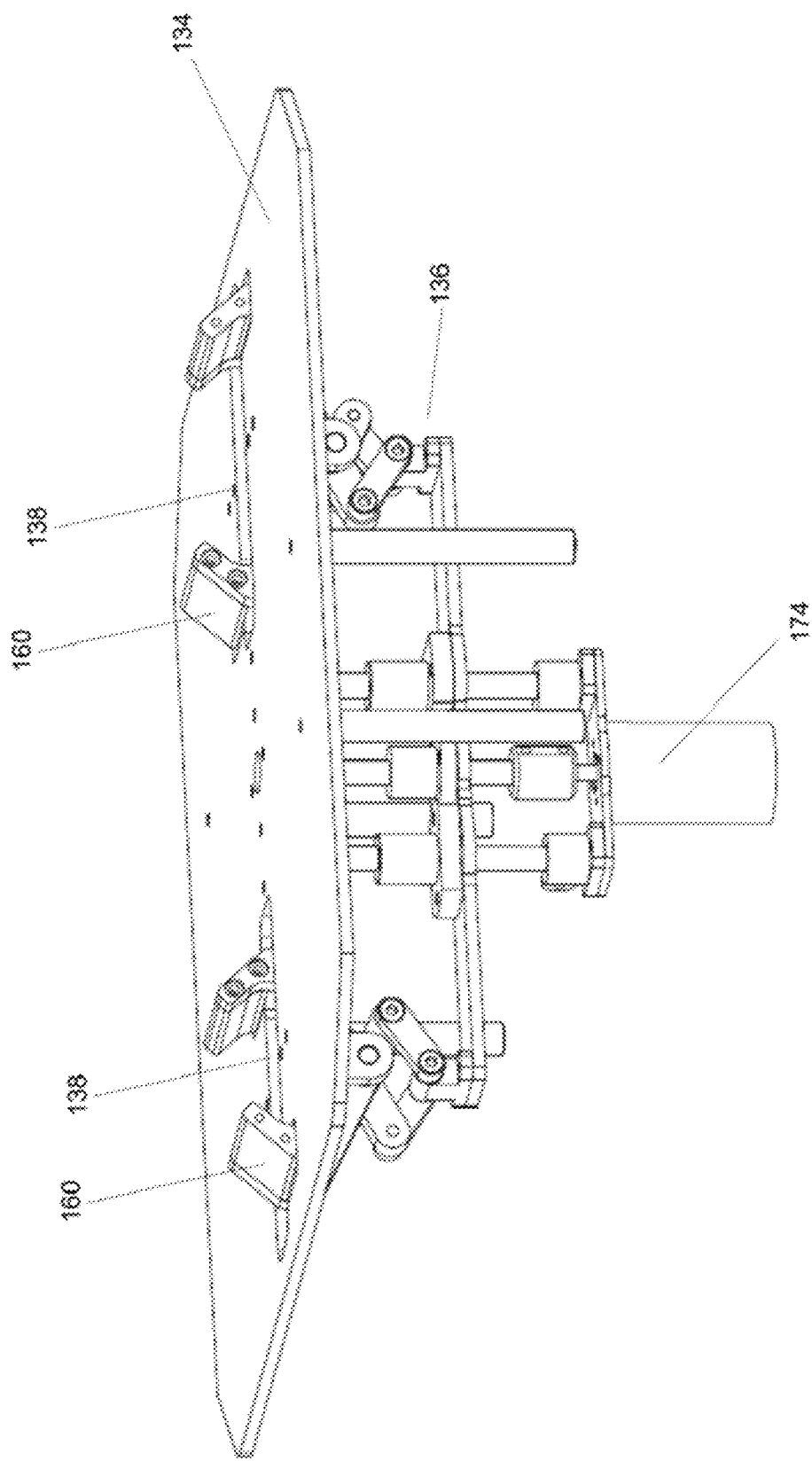
FIGS. 11 and 12 illustrate different schematic views of a coupling unit attached to a landing area, in accordance with some embodiments.
Figure 12:
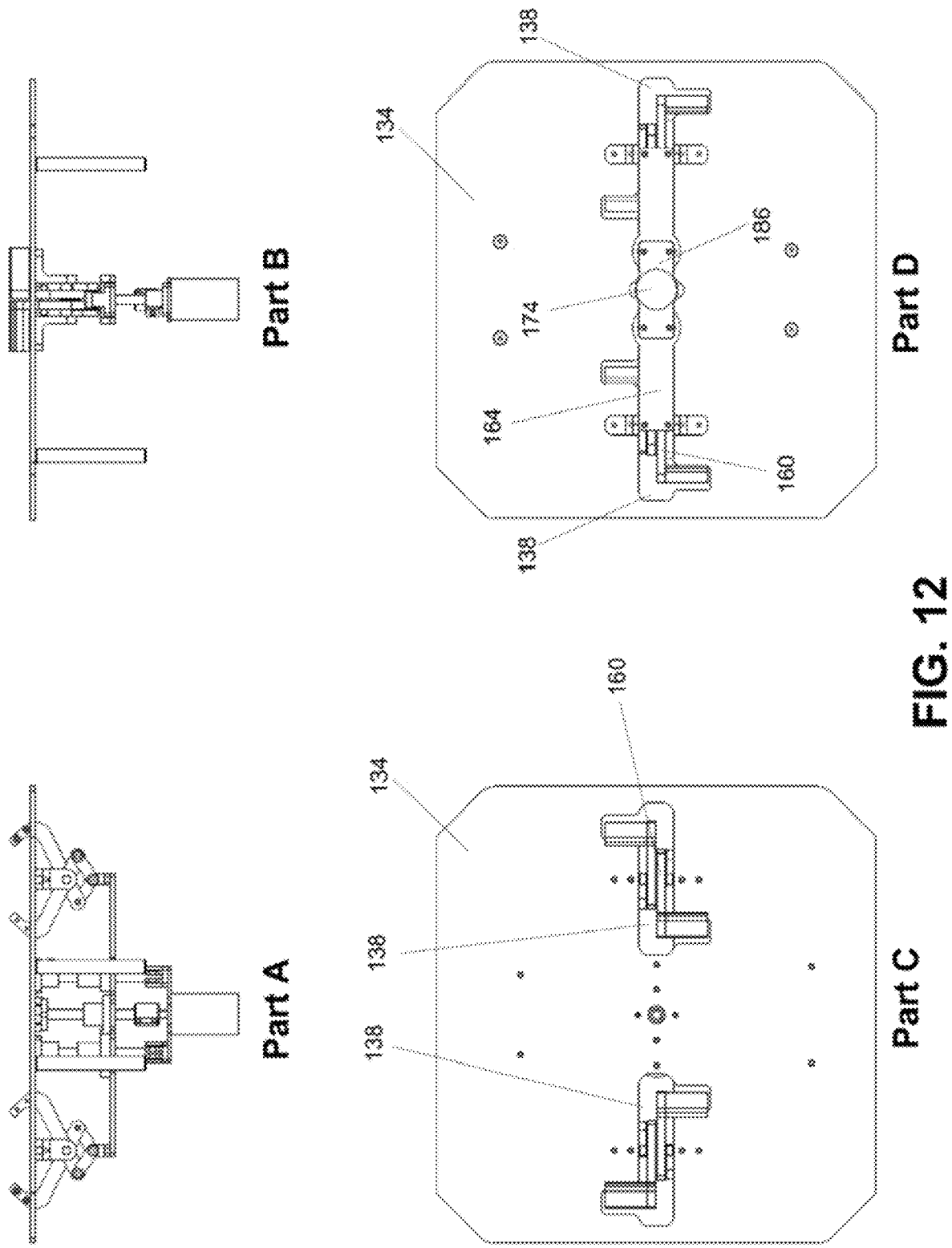

FIG. 11 illustrates a schematic view of a coupling unit attached to a landing area, in accordance with some embodiments. The landing area may correspond to the landing area 134 shown in FIG. 8. The coupling unit may correspond to the coupling unit 136 shown in FIGS. 9 and 10. FIG. 12 illustrates different schematic views of the embodiment of FIG. 11. In FIG. 12, parts A and B depict different side schematic views, part C depicts a top schematic view, and part D depicts a bottom schematic view.

The landing area may comprise one or more hollow structures 138 for accommodating the gripping structures. When the screw rod rotates to elevate the horizontal bar, the gripping structures 160 may protrude through the hollow structures from below the landing area 134 towards above the landing area. Conversely, when the screw rod rotates to lower the horizontal bar, the gripping structures may retract through the hollow structures from above the landing area towards below the landing area.

Figure 13:
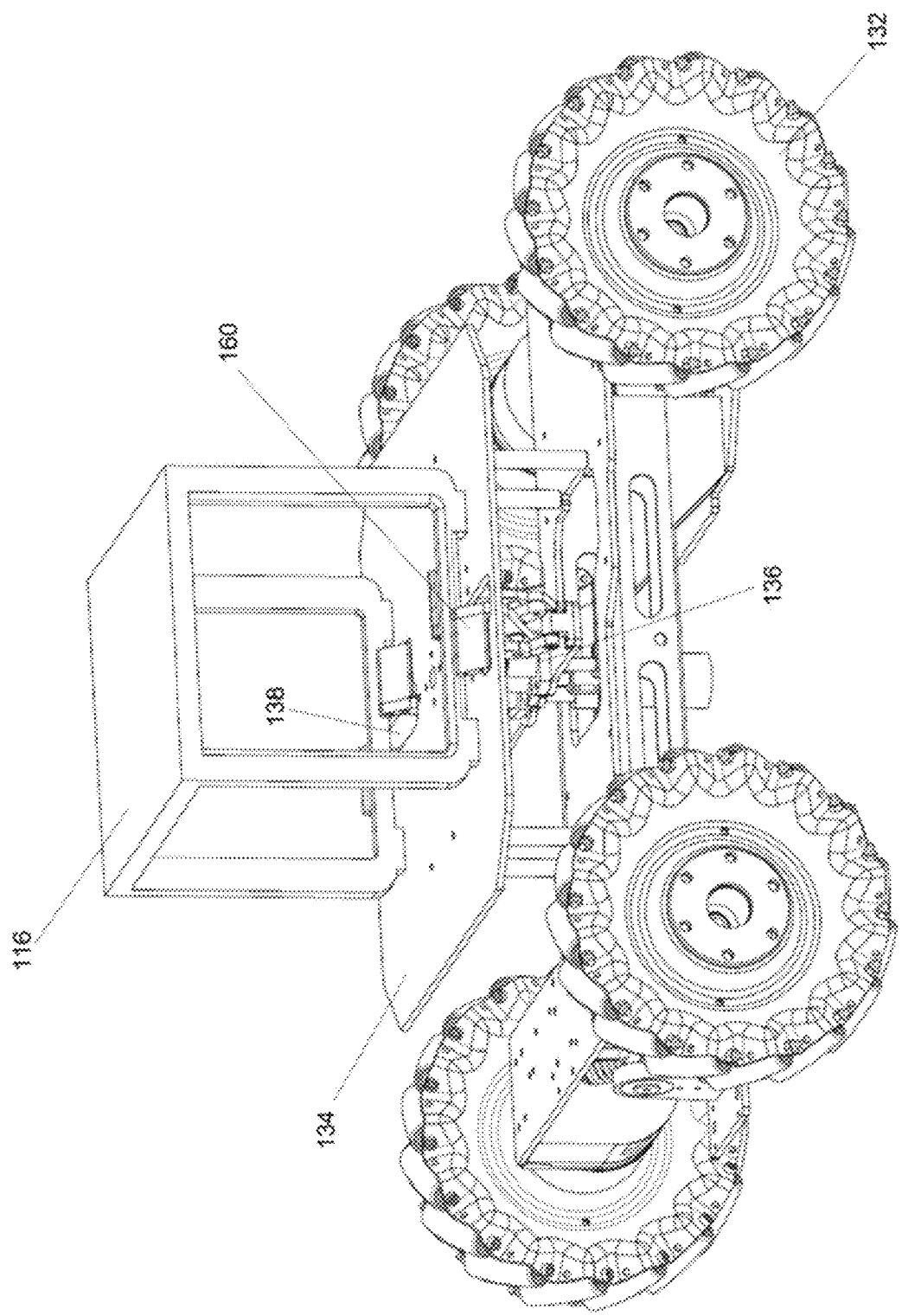
Figure 14:
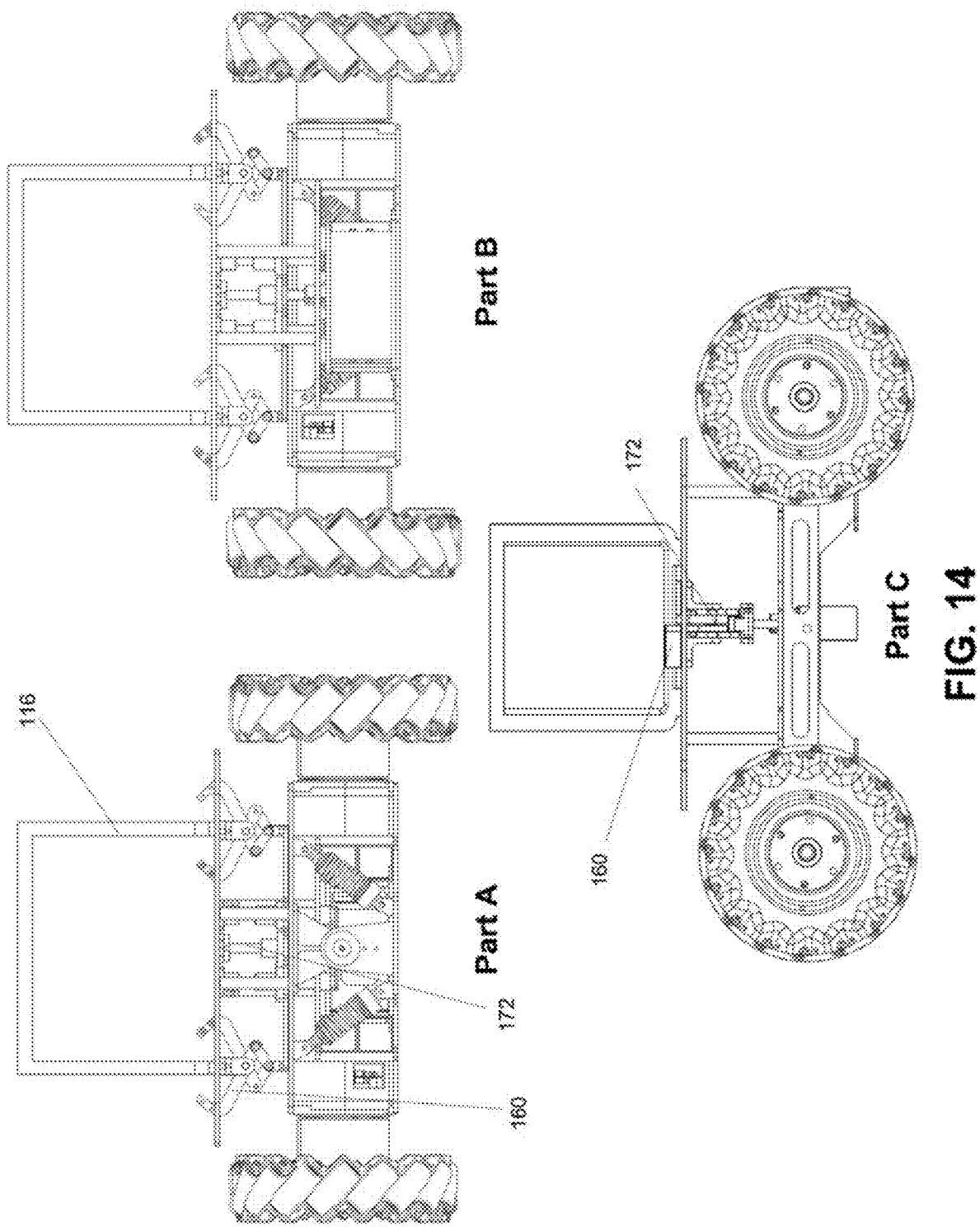

The embodiments in FIGS. 9, 10, and 11 may be provided in an unmanned carrier, for example as shown in FIGS. 13, 14, and 15. FIG. 13 depicts a perspective schematic view of an unmanned carrier comprising a coupling unit. Parts A, B, and C of FIG. 14 depict different side schematic views of the unmanned carrier comprising the coupling unit. Parts A and B of FIG. 15 respectively depict top and bottom schematic views of the unmanned carrier comprising the coupling unit.

The unmanned carrier may be similar to the embodiment previously described with reference to FIG. 8. The unmanned carrier may be configured to support a UAV when the UAV is landed on the unmanned carrier. In the interest of clarity, only a portion of the UAV (landing stand 116) is being shown in FIGS. 13, 14, and 15. The gripping structures 160 of the coupling unit on the unmanned carrier may be configured to couple/decouple with the landing stand of the UAV, as described elsewhere herein.

In some embodiments, the one or more gripping structures may be configured to couple to the UAV when the UAV is flying at a horizontal velocity that is substantially similar to a horizontal velocity of the unmanned carrier. In some instances, openings of the one or more gripping structures may be changed simultaneously as the elevation of the one or more gripping structures is adjusted. Alternatively, the one or more gripping structures may be configured to couple to the UAV when the UAV flies and lands onto a stationary unmanned carrier.

Different types of coupling units in accordance with various embodiments are next described with reference to FIGS. 16 and 17.

Figure 16:
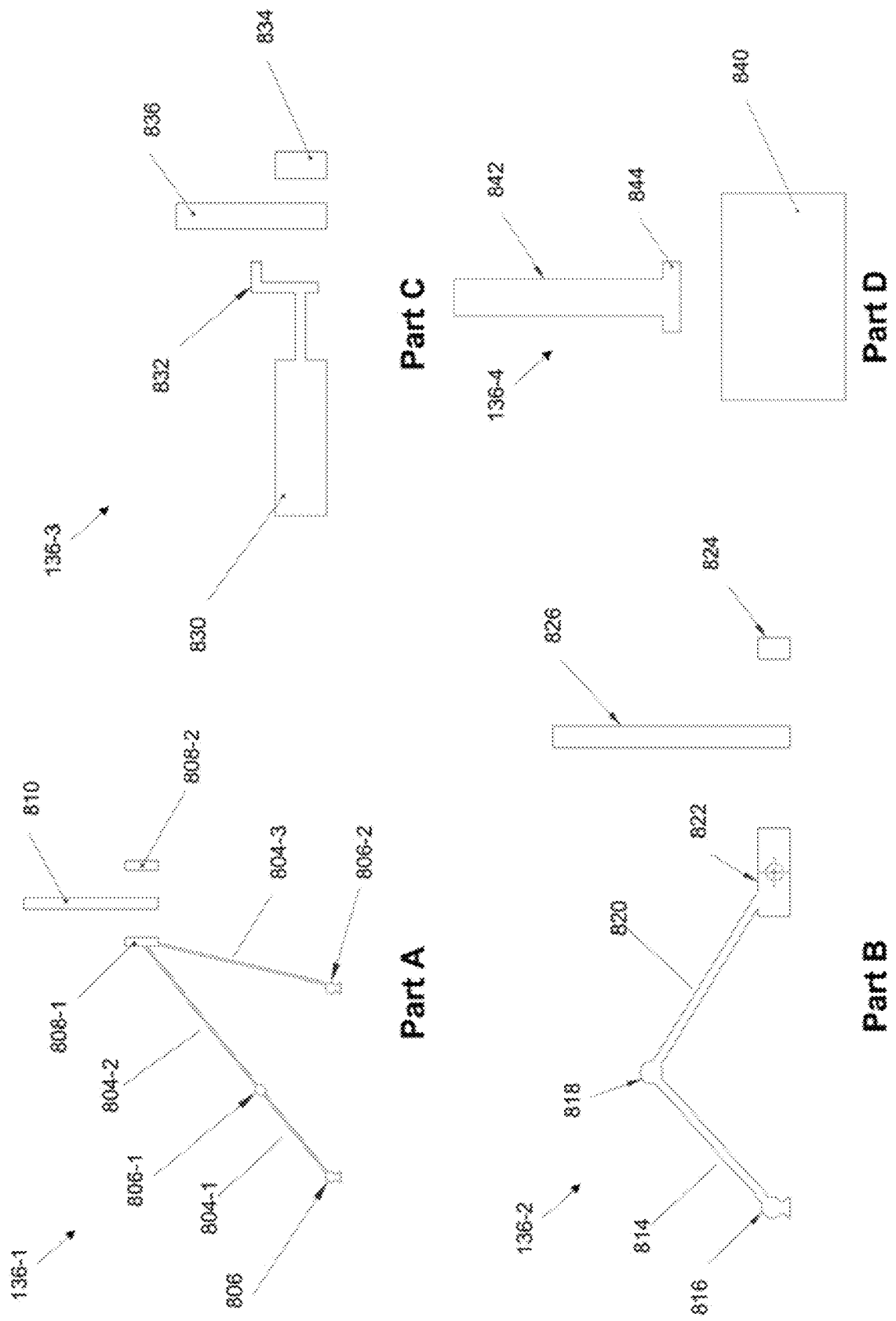
FIGS. 16 and 17 illustrate different types of coupling units, in accordance with some embodiments.

Referring to part A of FIG. 16, a coupling unit 136-1 may comprise a first rigid member 804-1 comprising a first end connected to a motor 806. The motor may be configured to provide a pivoting motion of the first rigid member. The first rigid member may also comprise a second end connected to a first hinge joint 806-1. The coupling unit may also comprise a second rigid member 804-2 comprising a first end connected to the first hinge joint 804-1 and a second end connected to a hinge board 808-1. The hinge board may be configured to lock a portion 810 of a UAV when the hinge board is coupled with an opposite board 808-2. The portion 810 may be, for example, a landing stand of the UAV. The coupling unit may further comprise a third rigid member 804-3 comprising a first end connected to the hinge board 808-1 and a second end connected to a second hinge joint 806-2. The hinge board may be configured to couple or decouple with the opposite board when the first rigid member pivots.

Referring to part B of FIG. 16, a coupling unit 136-2 may comprise a first rigid member 814 comprising a first end connected to a motor 816. The motor may be configured to provide a pivoting motion of the first rigid member. The first rigid member may also comprise a second end connected to a hinge joint 818. The coupling unit may also comprise a second rigid member 820 comprising a first end connected to the hinge joint and a second end connected to a sliding block 822. When the first rigid member pivots, the sliding block slides to couple or decouple with an opposite board 824 to lock or unlock a portion 826 of the UAV. The portion 826 may be, for example, a landing stand of the UAV.

Referring to part C of FIG. 16, a coupling unit 136-3 may comprise an air cylinder 830 configured to provide linear motion of a protrusion 832 connected to the air cylinder, to couple or decouple with a stopping board 834 to lock or unlock a portion 836 of a UAV. The portion 836 may be, for example, a landing stand of the UAV. The protrusion may be configured to be inserted through a hollow structure in the portion 836, to couple with the stopping board so as to lock the UAV.

Referring to part D of FIG. 16, a coupling unit 136-4 may comprise an electromagnet 840. The electromagnet may be configured to couple or decouple with a portion 842 of a UAV, via a magnet 844 disposed on the portion of the UAV. The portion 842 may be, for example, a landing stand of the UAV. Accordingly, the coupling unit may be configured to lock or unlock the portion of the UAV via a magnetic connection.

Figure 17:
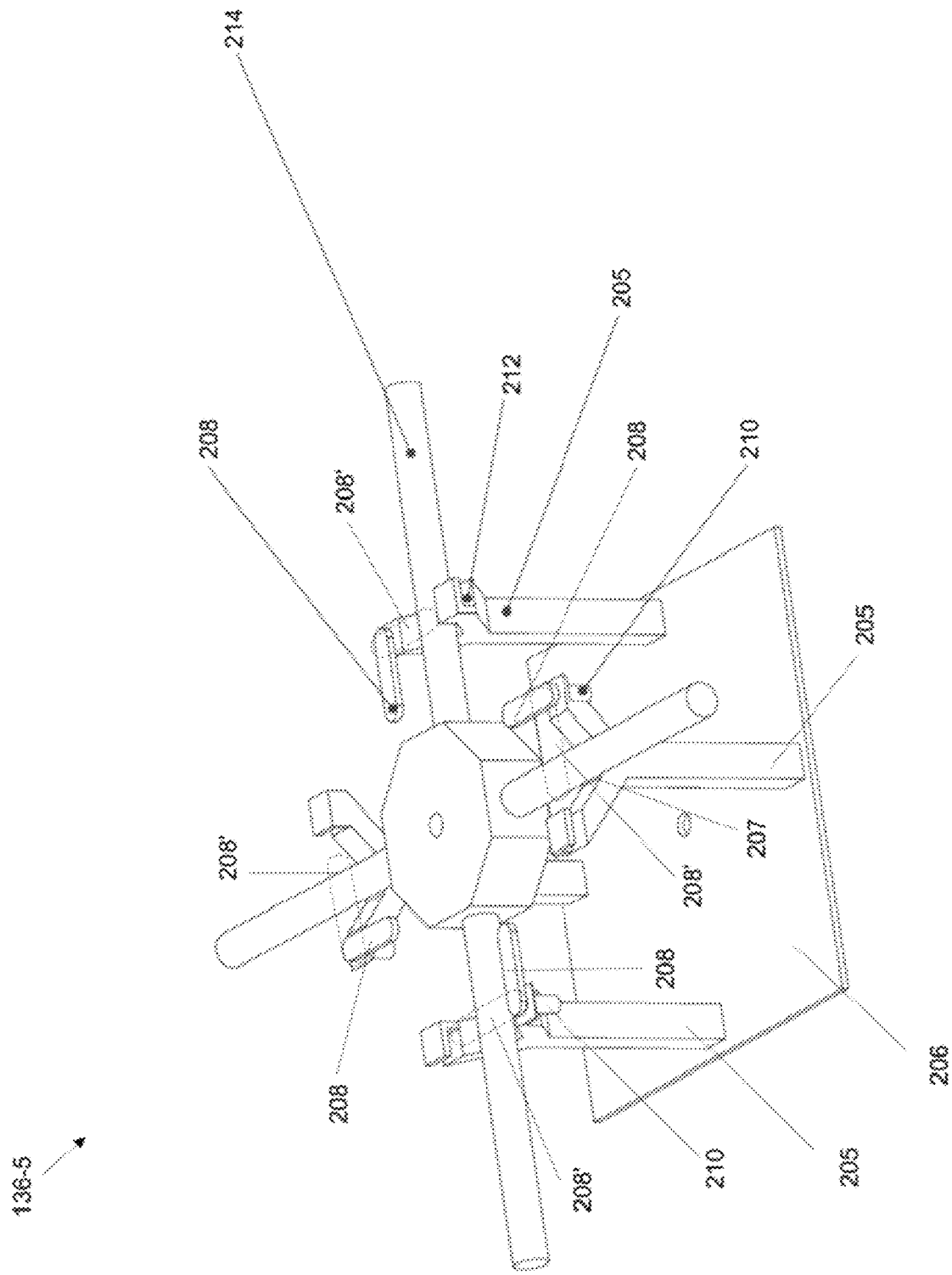

FIG. 17 illustrates a schematic view of a coupling unit 136-5 in accordance with some embodiments. The coupling unit may be provided on an unmanned carrier (not shown). The coupling unit may comprise a plurality of support stands 205 attached to a base 206. An end portion of each support stand may have a V-groove 207. A portion 214 (e.g., a landing component) of a UAV may be supported at the V-groove end portions of the support stand. Each support stand may further comprise a blocker 208 disposed at the V-groove end portion. The blocker may be rotatably coupled to the support stand via a hinge joint 210. The blocker may be configured to rotate between an open position and a closed position. When the blocker is in the closed position, it is denoted by 208' such that the blocker is aligned towards end 212 of the V-groove portion. As shown in FIG. 17, the portion 214 of the UAV may be supported on the V-groove portions of the support stands. When the blockers are in the open position, the UAV may be allowed to take off from the unmanned carrier. Conversely, when the blockers are in the closed position 208', the UAV may be locked by the coupling unit and prevented from taking off.

The systems, devices, and methods described herein can be applied to a wide variety of movable objects. As previously mentioned, any description herein of an aerial vehicle, such as a UAV, may apply to and be used for any movable object. Any description herein of an aerial vehicle may apply specifically to UAVs. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$3, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

A UAV may be an example of a movable object as described herein. The UAV can include a propulsion system having any number of rotors (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length. For example, the length can be less than or equal to 2 m, or less than equal to 5 m. In some embodiments, the length can be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 18:
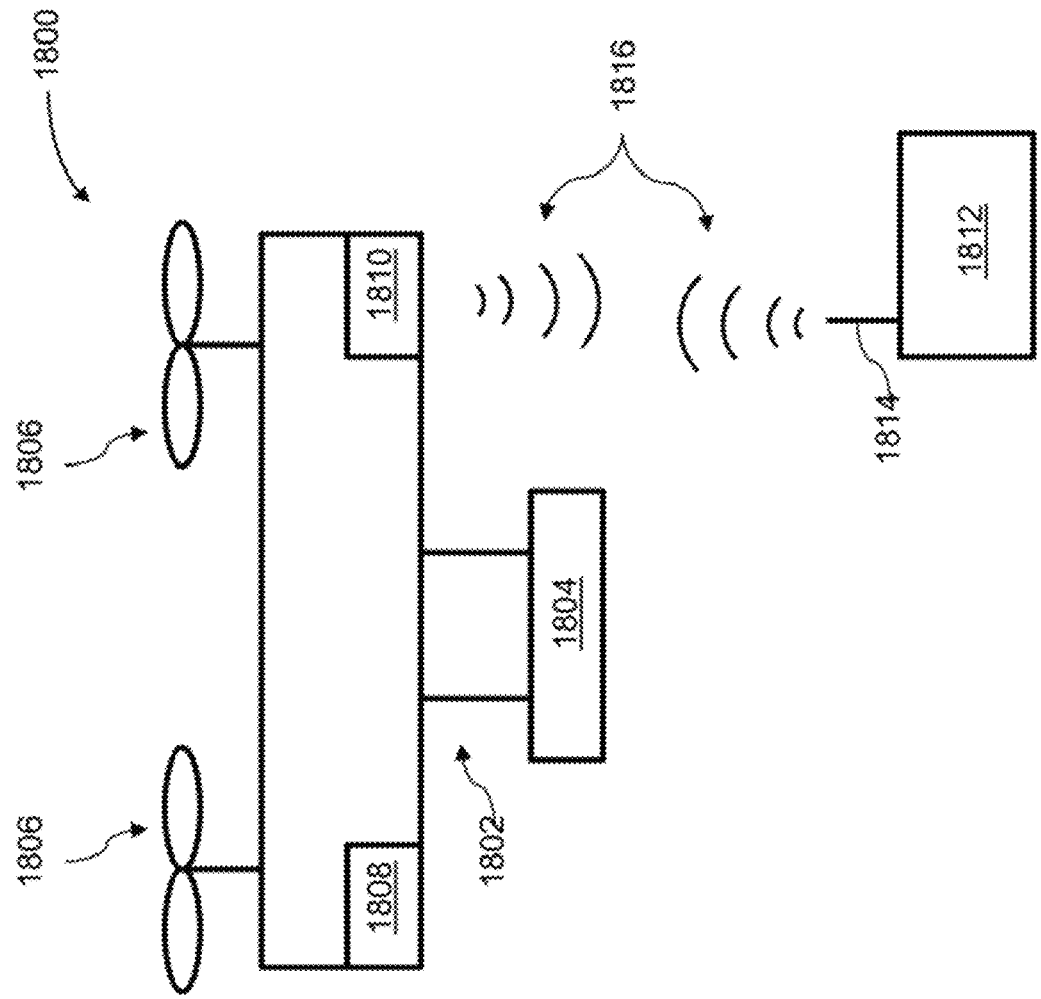
FIG. 18 illustrates a movable object including a support platform and a payload, in accordance with some embodiments.

FIG. 18 illustrates a movable object 1800 including a support platform 1802 and a payload 1804, in accordance with embodiments. Although the movable object 1800 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1804 may be provided on the movable object 1800 without requiring the support platform 1802. The movable object 1800 may include propulsion mechanisms 1806, a sensing system 1808, and a communication system 1810.

The propulsion mechanisms 1806 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 506 can be mounted on the movable object 1800 using any suitable means, such as a support element (e.g., a drive shaft) as described elsewhere herein. The propulsion mechanisms 1806 can be mounted on any suitable portion of the movable object 1800, such on the top, bottom, front, back, sides, or suitable combinations thereof.

In some embodiments, the propulsion mechanisms 1806 can enable the movable object 1800 to take off vertically from a surface or land vertically on a surface without requiring any horizontal movement of the movable object 1800 (e.g., without traveling down a runway). Optionally, the propulsion mechanisms 1806 can be operable to permit the movable object 1800 to hover in the air at a specified position and/or orientation. One or more of the propulsion mechanisms 1800 may be controlled independently of the other propulsion mechanisms. Alternatively, the propulsion mechanisms 1800 can be configured to be controlled simultaneously. For example, the movable object 1800 can have multiple horizontally oriented rotors that can provide lift and/or thrust to the movable object. The multiple horizontally oriented rotors can be actuated to provide vertical takeoff, vertical landing, and hovering capabilities to the movable object 1800. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1800 (e.g., with respect to up to three degrees of translation and up to three degrees of rotation).

The sensing system 1808 can include one or more sensors that may sense the spatial disposition, velocity, and/or acceleration of the movable object 1800 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1808 can be used to control the spatial disposition, velocity, and/or orientation of the movable object 1800 (e.g., using a suitable processing unit and/or control module, as described below). Alternatively, the sensing system 508 can be used to provide data regarding the environment surrounding the movable object, such as weather conditions, proximity to potential obstacles, location of geographical features, location of manmade structures, and the like.

The communication system 1810 enables communication with terminal 1812 having a communication system 1814 via wireless signals 1816. The communication systems 1810, 1814 may include any number of transmitters, receivers, and/or transceivers suitable for wireless communication. The communication may be one-way communication, such that data can be transmitted in only one direction. For example, one-way communication may involve only the movable object 1800 transmitting data to the terminal 1812, or vice-versa. The data may be transmitted from one or more transmitters of the communication system 1810 to one or more receivers of the communication system 1812, or vice-versa. Alternatively, the communication may be two-way communication, such that data can be transmitted in both directions between the movable object 1800 and the terminal 1812. The two-way communication can involve transmitting data from one or more transmitters of the communication system 1810 to one or more receivers of the communication system 1814, and vice-versa.

In some embodiments, the terminal 1812 can provide control data to one or more of the movable object 1800, support platform 1802, and payload 1804 and receive information from one or more of the movable object 1800, support platform 1802, and payload 1804 (e.g., position and/or motion information of the movable object, support platform or payload; data sensed by the payload such as image data captured by a payload camera). In some instances, control data from the terminal may include instructions for relative positions, movements, actuations, or controls of the movable object, support platform and/or payload. For example, the control data may result in a modification of the location and/or orientation of the movable object (e.g., via control of the propulsion mechanisms 1806), or a movement of the payload with respect to the movable object (e.g., via control of the support platform 1802). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, support platform and/or payload may include information from one or more sensors (e.g., of the sensing system 1808 or of the payload 1804). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, support platform and/or payload. Such information from a payload may include data captured by the payload or a sensed state of the payload. The control data provided transmitted by the terminal 1812 can be configured to control a state of one or more of the movable object 1800, support platform 1802, or payload 1804. Alternatively or in combination, the support platform 1802 and payload 1804 can also each include a communication module configured to communicate with terminal 1812, such that the terminal can communicate with and control each of the movable object 1800, support platform 1802, and payload 1804 independently.

In some embodiments, the movable object 1800 can be configured to communicate with another remote device in addition to the terminal 1812, or instead of the terminal 1812. The terminal 1812 may also be configured to communicate with another remote device as well as the movable object 1800. For example, the movable object 1800 and/or terminal 1812 may communicate with another movable object, or a support platform or payload of another movable object. When desired, the remote device may be a second terminal or other computing device (e.g., computer, laptop, tablet, smartphone, or other mobile device). The remote device can be configured to transmit data to the movable object 1800, receive data from the movable object 1800, transmit data to the terminal 1812, and/or receive data from the terminal 1812. Optionally, the remote device can be connected to the Internet or other telecommunications network, such that data received from the movable object 1800 and/or terminal 1812 can be uploaded to a website or server.

Figure 19:
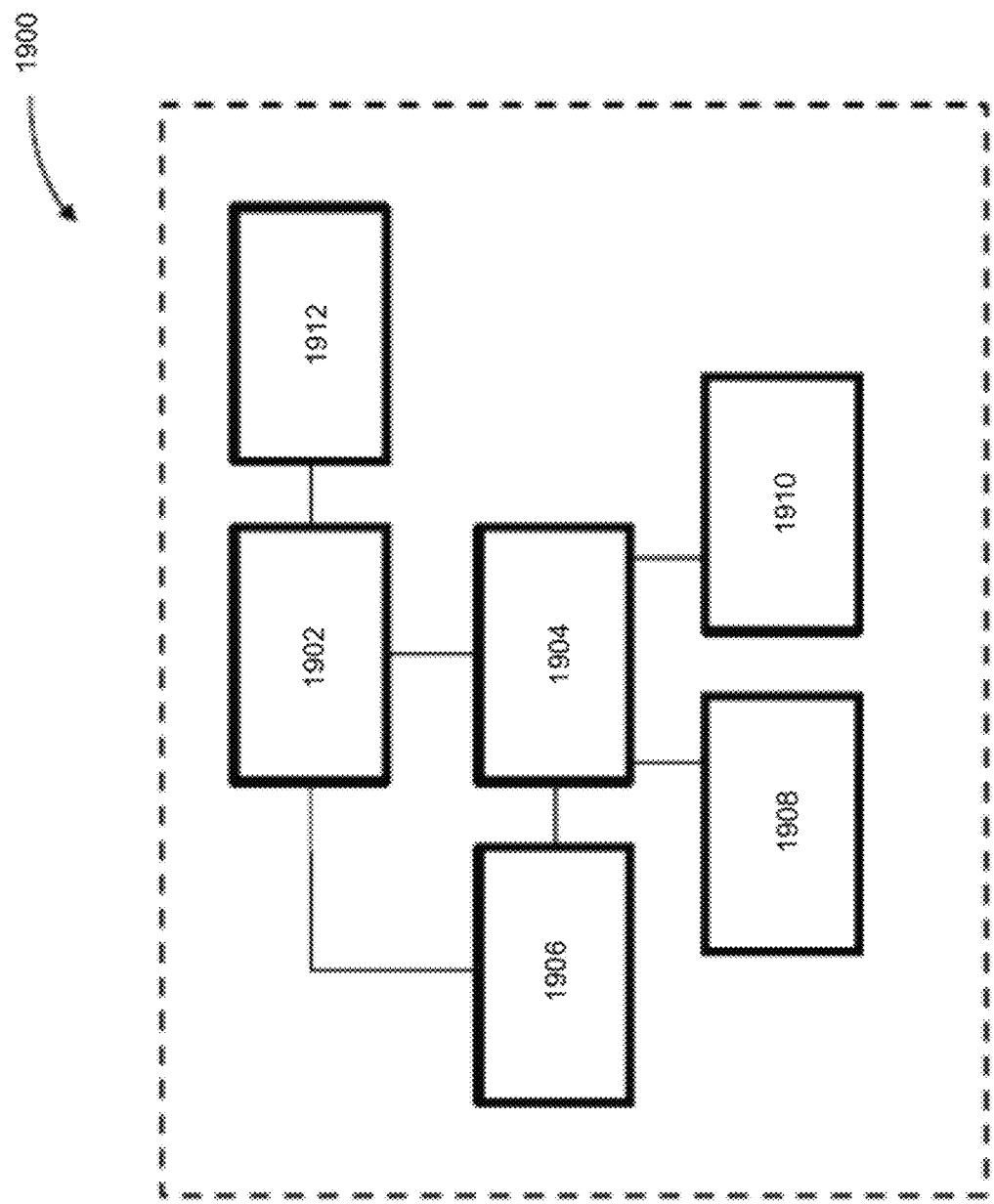
FIG. 19 is a schematic illustration by way of block diagram of a system for controlling a movable object, in accordance with some embodiments.

FIG. 19 is a schematic illustration by way of block diagram of a system 1900 for controlling a movable object, in accordance with embodiments. The system 1900 can be used in combination with any suitable embodiment of the systems, devices, and methods disclosed herein. The system 1900 can include a sensing module 1902, processing unit 1904, non-transitory computer readable medium 1906, control module 1908, and communication module 1910.

The sensing module 1902 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1902 can be operatively coupled to a processing unit 1904 having a plurality of processors. In some embodiments, the sensing module can be operatively coupled to a transmission module 1912 (e.g., a Wi-Fi image transmission module) configured to directly transmit sensing data to a suitable external device or system. For example, the transmission module 1912 can be used to transmit images captured by a camera of the sensing module 1902 to a remote terminal.

The processing unit 1904 can have one or more processors, such as a programmable processor (e.g., a central processing unit (CPU)). The processing unit 1904 can be operatively coupled to a non-transitory computer readable medium 1906. The non-transitory computer readable medium 1906 can store logic, code, and/or program instructions executable by the processing unit 1904 for performing one or more steps. The non-transitory computer readable medium can include one or more memory units (e.g., removable media or external storage such as an SD card or random access memory (RAM)). In some embodiments, data from the sensing module 1902 can be directly conveyed to and stored within the memory units of the non-transitory computer readable medium 1906. The memory units of the non-transitory computer readable medium 1906 can store logic, code and/or program instructions executable by the processing unit 1904 to perform any suitable embodiment of the methods described herein. For example, the processing unit 1904 can be configured to execute instructions causing one or more processors of the processing unit 1904 to analyze sensing data produced by the sensing module. The memory units can store sensing data from the sensing module to be processed by the processing unit 1904. In some embodiments, the memory units of the non-transitory computer readable medium 1906 can be used to store the processing results produced by the processing unit 1904.

In some embodiments, the processing unit 1904 can be operatively coupled to a control module 1908 configured to control a state of the movable object. For example, the control module 1908 can be configured to control the propulsion mechanisms of the movable object to adjust the spatial disposition, velocity, and/or acceleration of the movable object with respect to six degrees of freedom. Alternatively or in combination, the control module 1908 can control one or more of a state of a support platform, payload, or sensing module.

The processing unit 1904 can be operatively coupled to a communication module 1910 configured to transmit and/or receive data from one or more external devices (e.g., a terminal, display device, or other remote controller). Any suitable means of communication can be used, such as wired communication or wireless communication. For example, the communication module 1910 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1910 can transmit and/or receive one or more of sensing data from the sensing module 1902, processing results produced by the processing unit 1904, predetermined control data, user commands from a terminal or remote controller, and the like.

The components of the system 1900 can be arranged in any suitable configuration. For example, one or more of the components of the system 1900 can be located on the movable object, support platform, payload, terminal, sensing system, or an additional external device in communication with one or more of the above. Additionally, although FIG. 19 depicts a single processing unit 1904 and a single non-transitory computer readable medium 1906, one of skill in the art would appreciate that this is not intended to be limiting, and that the system 1900 can include a plurality of processing units and/or non-transitory computer readable media. In some embodiments, one or more of the plurality of processing units and/or non-transitory computer readable media can be situated at different locations, such as on the movable object, support platform, payload, terminal, sensing module, additional external device in communication with one or more of the above, or suitable combinations thereof, such that any suitable aspect of the processing and/or memory functions performed by the system 1900 can occur at one or more of the aforementioned locations.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. An image capturing method for an unmanned aerial vehicle (UAV) comprising:
   determining, with aid of one or more processors individually or collectively, whether the UAV is in:
      a ground mode in which the UAV is physically carried on an unmanned carrier and movable with the unmanned carrier, or
      a flight mode in which the UAV is released from the unmanned carrier;
   automatically adjusting a state of a camera carried by the UAV to be:

a first state in response to the UAV being in the ground mode, or a second state in response to the UAV being in the flight mode; and controlling the camera to capture an image using:

the first state in response to the UAV being in the ground mode in which the UAV is physically carried on the unmanned carrier and movable with the unmanned carrier, and the second state in response to the UAV being in the flight mode.

2. The method of claim 1, further comprising:
transmitting the image to a remote terminal.

3. The method of claim 1, wherein the UAV is configured to switch between the ground mode and the flight mode in accordance with a signal received from a remote control terminal.

4. The method of claim 1, wherein the UAV is configured to switch between the ground mode and the flight mode based on relative position information between the UAV and the unmanned carrier.

5. The method of claim 4, wherein the relative position information is determined based on positional data measured by one or more sensors carried by the UAV or on the unmanned carrier.

6. The method of claim 1, wherein the unmanned carrier further comprises:
a landing area configured to support the UAV when the UAV is landed on the unmanned carrier; and
a coupling unit configured to releasably couple with the UAV when the UAV is borne by the landing area.

7. The method of claim 6, wherein the coupling unit comprises one or more gripping structures configured to releasably lock one or more landing gears of the UAV on the landing area.

8. The method of claim 1,
wherein the image captured by the camera carried by the UAV is a first image;
the method further comprising:
transmitting the first image and a second image captured by a camera attached to the unmanned carrier to a remote control terminal, the second image being an image of a ground environment of the UAV in the flight mode.

9. The method of claim 8, wherein the first image and the second image are complementary to each other.

10. The method of claim 1, wherein the camera is attached to a gimbal mounted at the UAV.

11. The method of claim 1, wherein the state of the camera comprises at least one of position of the camera, orientation of the camera about one or more axes, or zoom of the camera.

12. The method of claim 1, further comprising:
receiving, through a communication module of the UAV, signals from the unmanned carrier with respect to switching between the ground mode and the flight mode.

13. The method of claim 1, wherein automatically adjusting the state of the camera includes adjusting an angle of the camera relative to a direction of gravity.

14. The method of claim 13, wherein the angle is in a range from about 70° to about 90° in the first state.

15. The method of claim 13, wherein the angle is in a range from about 0° to about 30° in the second state.

16. The method of claim 13, wherein the angle of the camera is adjusted instantaneously in response to the camera changing from the first state to the second state.

17. The method of claim 13, wherein the angle of the camera is adjusted gradually in response to the camera changing from the first state to the second state.

18. An image capturing system for an unmanned aerial vehicle (UAV) comprising:
one or more processors, individually or collectively configured to:
determine whether the UAV is in:
a ground mode in which the UAV is physically carried on an unmanned carrier and movable with the unmanned carrier, or
a flight mode in which the UAV is released from the unmanned carrier;
automatically adjust a state of a camera carried by the UAV to be:
a first state in response to the UAV being in the ground mode, or
a second state in response to the UAV being in the flight mode; and
control the camera to capture an image using:
the first state in response to the UAV being in the ground mode in which the UAV is physically carried on the unmanned carrier and movable with the unmanned carrier, and
the second state in response to the UAV being in the flight mode.

* * * * *